US012771152B2

(12) United States Patent
Okada et al.

(10) Patent No.: US 12,771,152 B2
(45) Date of Patent: Oct. 20, 2026

(54) POWER STORAGE DEVICE, VEHICLE, POWER STORAGE DEVICE CONTROL METHOD, AND PROGRAM

(71) Applicant: HONDA MOTOR CO., LTD., Tokyo (JP)

(72) Inventors: Naoya Okada, Saitama (JP); Jyunichiro Abe, Saitama (JP); Takashi Fujiyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 888 days.

(21) Appl. No.: 17/784,446

(22) PCT Filed: Dec. 11, 2020

(86) PCT No.: PCT/JP2020/046437
§ 371 (c)(1),
(2) Date: Jun. 10, 2022

(87) PCT Pub. No.: WO2021/117902
PCT Pub. Date: Jun. 17, 2021

(65) Prior Publication Data
US 2023/0006453 A1 Jan. 5, 2023

(30) Foreign Application Priority Data
Dec. 13, 2019 (JP) ................................ 2019-225690

(51) Int. Cl.
*H02J 7/00* (2026.01)
*B60L 58/12* (2019.01)
(Continued)

(52) U.S. Cl.
CPC .............. *H02J 7/663* (2026.01); *B60L 58/12* (2019.02); *B60L 58/14* (2019.02); *H02J 7/40* (2026.01);
(Continued)

(58) Field of Classification Search
CPC .... H02J 7/0031; H02J 7/00032; H02J 7/0013; H02J 7/0047; H02J 7/0048;
(Continued)

(56) References Cited

U.S. PATENT DOCUMENTS

2006/0159991 A1 7/2006 Takeshita et al.
2010/0076638 A1 * 3/2010 Kitanaka ............... B60L 3/0061 361/30
(Continued)

FOREIGN PATENT DOCUMENTS

CN 103068620 A 4/2013
CN 103370847 A 10/2013
(Continued)

OTHER PUBLICATIONS

Mar. 3, 2025, Translation of Chinese Office Action issued for related CN Application No. 202080086127.3.
(Continued)

*Primary Examiner* — Zixuan Zhou
(74) *Attorney, Agent, or Firm* — Paratus Law Group, PLLC

(57) ABSTRACT

A power storage device (4) includes a power storage unit (1211) including a plurality of cells, and a BMU (1212) configured to control the power storage unit (1211). The BMU (1212) includes an upper limit power acquisition unit (23) configured to acquire, based on a SOC and a temperature of the power storage unit (1211), an upper limit power that is an upper limit of a power output from the power storage unit (1211) or a power input to the power storage unit (1211).

25 Claims, 12 Drawing Sheets

(51) Int. Cl.

| | |
|---|---|
| ***B60L 58/14*** | (2019.01) |
| ***H02J 7/40*** | (2026.01) |
| ***H02J 7/50*** | (2026.01) |
| ***H02J 7/60*** | (2026.01) |
| ***H02J 7/80*** | (2026.01) |
| ***H02J 7/82*** | (2026.01) |
| ***H02J 7/90*** | (2026.01) |
| ***H02J 7/94*** | (2026.01) |

(52) U.S. Cl.
CPC .................. *H02J 7/50* (2026.01); *H02J 7/80* (2026.01); *H02J 7/82* (2026.01); *H02J 7/933* (2026.01); *H02J 7/94* (2026.01); *B60L 2240/545* (2013.01)

(58) Field of Classification Search
CPC ... H02J 7/00712; H02J 7/00714; B60L 58/12; B60L 58/14; B60L 2240/545
USPC ............................................ 320/109; 701/22
See application file for complete search history.

(56) References Cited

U.S. PATENT DOCUMENTS

| | | | | |
|---|---|---|---|---|
| 2011/0020698 | A1 | 1/2011 | Takeshita et al. | |
| 2011/0165442 | A1 | 7/2011 | Hashimoto et al. | |
| 2011/0297470 | A1* | 12/2011 | Heichal | B60L 50/66 180/68.5 |
| 2013/0154360 | A1 | 6/2013 | Ito | |
| 2014/0023902 | A1 | 1/2014 | Takeshita et al. | |
| 2014/0300180 | A1 | 10/2014 | Iwashita et al. | |
| 2016/0181581 | A1 | 6/2016 | Takeshita et al. | |
| 2018/0281618 | A1 | 10/2018 | Ogaki et al. | |
| 2019/0143820 | A1* | 5/2019 | Ying | B60L 53/11 307/10.6 |
| 2019/0386496 | A1 | 12/2019 | Honda et al. | |
| 2020/0176829 | A1 | 6/2020 | Nishikawa et al. | |
| 2020/0303929 | A1 | 9/2020 | Watanabe et al. | |

FOREIGN PATENT DOCUMENTS

| | | | |
|---|---|---|---|
| CN | 103972990 | A | 8/2014 |
| CN | 104917215 | A | 9/2015 |
| CN | 106711526 | A | 5/2017 |
| CN | 109121447 | A | 1/2019 |
| CN | 110235335 | A | 9/2019 |
| CN | 110892606 | A | 3/2020 |
| JP | 2001-122180 | A | 5/2001 |
| JP | 2006-158025 | A | 6/2006 |
| JP | 2008-153241 | A | 7/2008 |
| JP | 2008-312391 | A | 12/2008 |
| JP | 2010-273417 | A | 12/2010 |
| JP | 2011-108439 | A | 6/2011 |
| JP | 2015-070753 | A | 4/2015 |
| JP | 2018-014820 | A | 1/2018 |
| JP | 2019-189053 | A | 10/2019 |
| WO | WO 2010/007681 | A1 | 1/2010 |
| WO | WO 2018/147046 | A1 | 8/2018 |
| WO | WO 2019/049571 | A1 | 3/2019 |

OTHER PUBLICATIONS

Sep. 27, 2024, European Communication issued for related EP Application No. 20897783.5.
Jan. 8, 2024, European Search Report issued for related EP Application No. 20897783.5.
Mar. 9, 2021, International Search Report issued for related PCT Application No. PCT/JP2020/046437.
Mar. 9, 2021, International Search Opinion issued for related PCT Application No. PCT/JP2020/046437.
Jan. 7, 2025, Japanese Office Action translation issued for related JP Application No. 2021-564077.
Aug. 13, 2025, Indian Office Action issued for related IN Application No. 202247033254.
Aug. 5, 2025, Translation of Chinese Office Action issued for related CN Application No. 202080086127.3.
Jun. 10, 2025, Translation of Japanese Office Action issued for related JP Application No. 2021-564077.
Nov. 28, 2025, Translation of Chinese Office Action issued for related CN Application No. 202080086127.3.

* cited by examiner

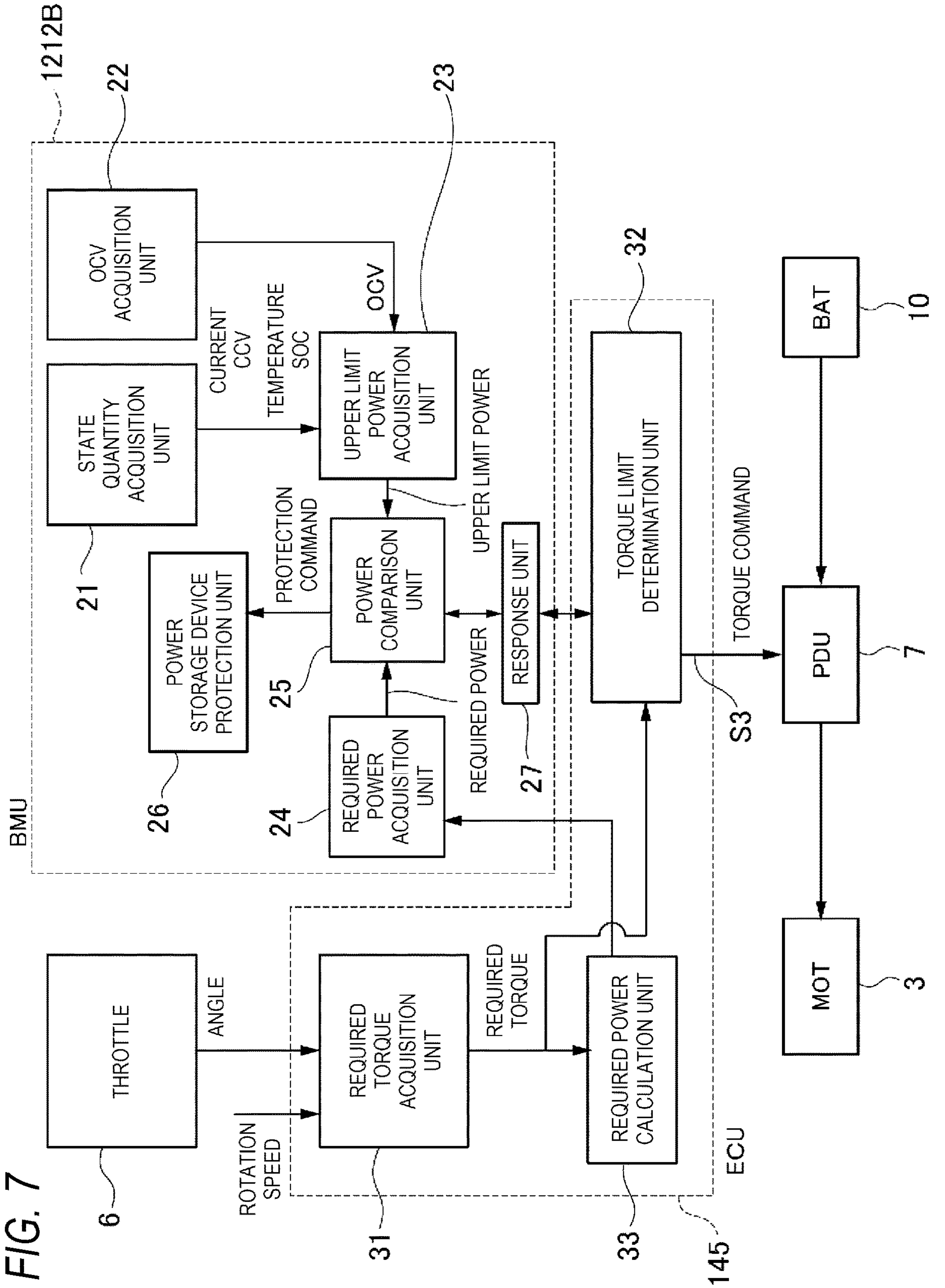
FIG. 7
1212B
BMU
OCV ACQUISITION UNIT
22
STATE QUANTITY ACQUISITION UNIT
21
CURRENT
CCV
TEMPERATURE
SOC
OCV
UPPER LIMIT POWER ACQUISITION UNIT
23
UPPER LIMIT POWER
PROTECTION COMMAND
POWER STORAGE DEVICE PROTECTION UNIT
26
POWER COMPARISON UNIT
25
REQUIRED POWER
REQUIRED POWER ACQUISITION UNIT
24
RESPONSE UNIT
27
TORQUE LIMIT DETERMINATION UNIT
32
TORQUE COMMAND
S3
BAT
10
PDU
7
MOT
3
THROTTLE
6
ANGLE
ROTATION SPEED
REQUIRED TORQUE ACQUISITION UNIT
31
REQUIRED TORQUE
REQUIRED POWER CALCULATION UNIT
33
ECU
145

POWER STORAGE DEVICE, VEHICLE, POWER STORAGE DEVICE CONTROL METHOD, AND PROGRAM

CROSS REFERENCE TO PRIOR APPLICATION

This application is a National Stage Patent Application of PCT International Patent Application No. PCT/JP2020/046437 (filed on Dec. 11, 2020) under 35 U.S.C. § 371, which claims priority to Japanese Patent Application No. 2019-225690 (filed on Dec. 13, 2019), which are all hereby incorporated by reference in their entirety.

TECHNICAL FIELD

The present invention relates to a power storage device, a vehicle, a power storage device control method, and a program.

BACKGROUND ART

In recent years, an electrically powered vehicle such as an electric vehicle (EV) which travels by a motor driven by a power of a battery has been developed. In the electrically powered vehicle, when the power of the battery, which is a power source, is exhausted, it is necessary to charge the battery.

The battery has an upper limit power of a power to be output or a power to be input. The upper limit power varies depending on an environment, and when the battery is used in excess of the upper limit power, deterioration of the battery is accelerated.

Some electrically powered vehicles use a detachable battery that is detachable. Therefore, development of a battery sharing service in which a plurality of users who use an apparatus to which a battery can be mounted share a detachable battery has been studied. The battery sharing service is preferably applicable not only to electrically powered vehicles of the same type but also to other electrically powered vehicles (for example, a motorcycle, a four-wheeled vehicle, a lawn mower) and other apparatuses (for example, a floodlight), but even with the detachable battery, it is necessary to appropriately understand an upper limit power on an apparatus side.

Patent Literature 1 describes an electrically assisted bicycle capable of finely controlling a traveling control of a vehicle by communicating information between a battery-side controller and a vehicle-side controller. Specifically, Patent Literature 1 discloses that a battery management controller constantly monitors a state of a battery, and performs a type determination of the battery, a battery remaining capacity calculation process, a maximum discharge current value calculation process for battery protection, a discharge stop determination, a discharge prohibition determination, a diagnosis information process for failure diagnosis, and other various calculation processes. Further, Patent Literature 1 discloses that a vehicle controller performs a battery map determination process, a current command calculation process, a battery current control process, a discharge stop process, a battery capacity calculation process, a diagnosis information process, and other various calculation processes based on various information from the battery management controller.

Patent Literature 2 describes a vehicle equipped with a battery that is not a detachable battery, in which a battery ECU provided in the vehicle calculates an output upper limit value of a normal battery and bypasses an abnormal battery.

CITATION LIST

Patent Literature

Patent Literature 1: JP-A-2001-122180
Patent Literature 2: JP-A-2010-273417

SUMMARY OF INVENTION

Technical Problem

However, in the electrically assisted bicycle of Patent Literature 1, it is necessary to perform recalculation with the vehicle controller in order to acquire an upper limit power. The electrically powered vehicle of Patent Literature 2 is not originally equipped with a detachable battery, but even if a detachable battery can be equipped, the battery ECU of the electrically powered vehicle calculates an output upper limit value.

In this way, when an upper limit power is calculated on an apparatus side to which a power storage device is equipped, there is no problem in using only a power storage device having a fixed specification, but when a power storage device having an unclear performance is used or when a power storage device having a different performance every time the power storage device is mounted is used, it is assumed that a power storage device is used in excess of an upper limit power of the power storage device, and deterioration of the power storage device is accelerated.

The present invention is to provide a power storage device, a vehicle, a power storage device control method, and a program capable of preventing deterioration of the power storage device regardless of an apparatus to which the power storage device is equipped.

Solution to Problem

The present invention provides a power storage device including:

- a power storage unit including a plurality of cells; and
- a power storage control unit configured to control the power storage unit, in which
- the power storage control unit includes an upper limit power acquisition unit configured to acquire, based on a state of the power storage unit, an upper limit power that is an upper limit of a power output from the power storage unit or a power input to the power storage unit.

The present invention provides a vehicle including:

- a mounting unit to which the above-described power storage device is mounted;
- a power apparatus electrically connected to the power storage device; and
- wheels, in which
- the power apparatus is an electric motor mechanically connected to the wheels.

A power storage device control method according to the present invention including:

a step of acquiring, by a computer of a power storage device provided to be electrically connectable to a power apparatus and including a power storage unit, based on a state of the power storage unit, an upper limit power that is an upper limit of a power output from the power storage unit or a power input to the power storage unit.

A program according to the present invention, in which the program is configured to cause a computer of a power storage device provided to be electrically connectable to a power apparatus and including a power storage unit to execute a step of acquiring, based on a state of the power storage unit, an upper limit power that is an upper limit of a power output from the power storage unit or a power input to the power storage unit.

Advantageous Effects of Invention

According to the present invention, deterioration of the power storage device is prevented regardless of an apparatus to which the power storage device is equipped.

BRIEF DESCRIPTION OF DRAWINGS

FIG. 7 is a block diagram showing a relationship between the battery control unit 1212B of the BMU 1212 and the management unit 145 of the ECU 5 in a power storage device protection control according to a second modification.

DESCRIPTION OF EMBODIMENTS

Hereinafter, embodiments of the present invention will be described with reference to the drawings. In the following description, an electric motorcycle (a first embodiment) and an electric vehicle (a second embodiment) will be described as examples of an apparatus to which a power storage device can be equipped.

First Embodiment

[Vehicle]

Figure 1:
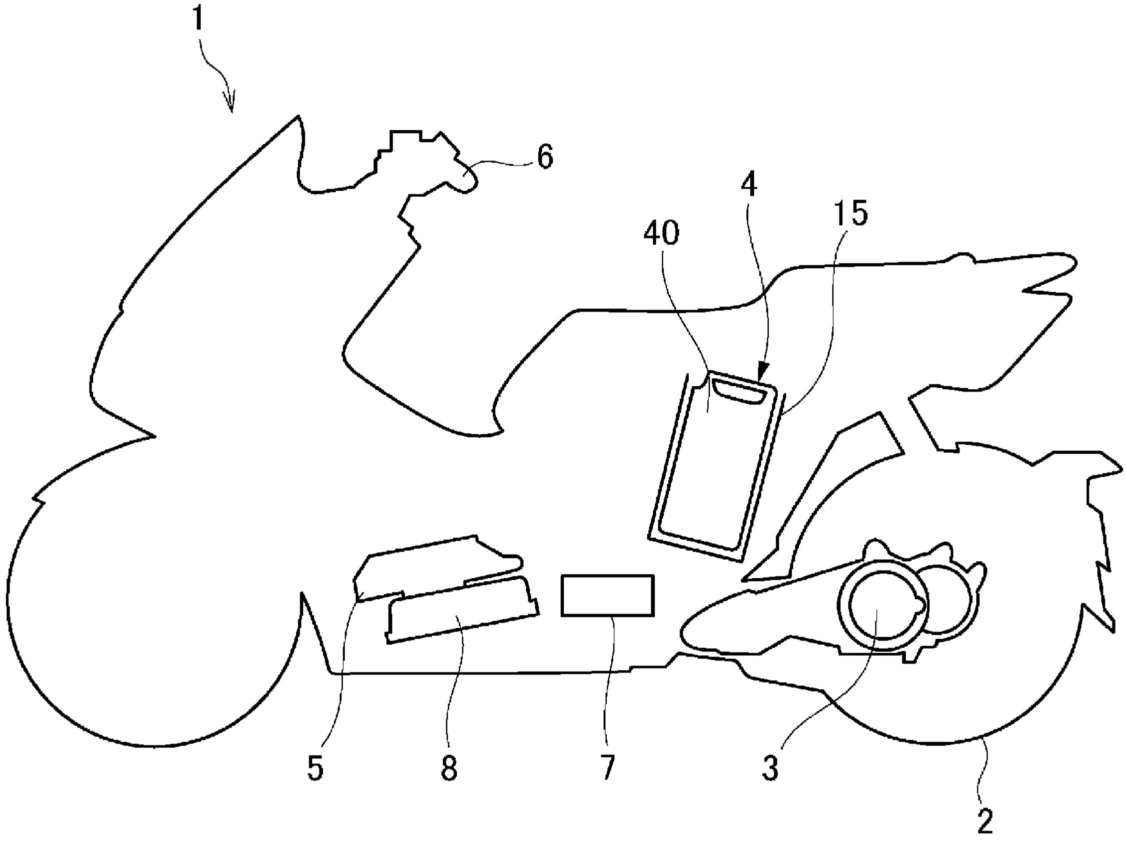
FIG. 1 is a schematic side view showing a vehicle 1 (an electric motorcycle) according to a first embodiment of the present invention.

As shown in FIG. 1, a vehicle 1 of the present embodiment is a motorcycle that includes a motor 3 mechanically connected to a wheel 2 (a rear wheel) and driving the wheel 2, a detachable power storage device 4 provided to be electrically connectable to the motor 3 and supplying a driving power of the motor 3, a battery mounting unit 15 to which the power storage device 4 is mounted, an electric control unit (ECU) 5 controlling the motor 3, a throttle 6 operated by an occupant, a power drive unit (PDU) 7 driving the motor 3 in response to a torque command from the ECU 5, and a charging device 8 charging the power storage device 4. The vehicle 1 travels by driving the motor 3 with the PDU 7 by a power supplied from the power storage device 4 via an electric circuit 110 (FIG. 2) and transmitting a rotational power when the motor 3 is driven to the wheel 2. A state of the equipped power storage device 4 is managed by a control system 10 (FIG. 2).

[Control System for Power Storage Device]

Figure 2:
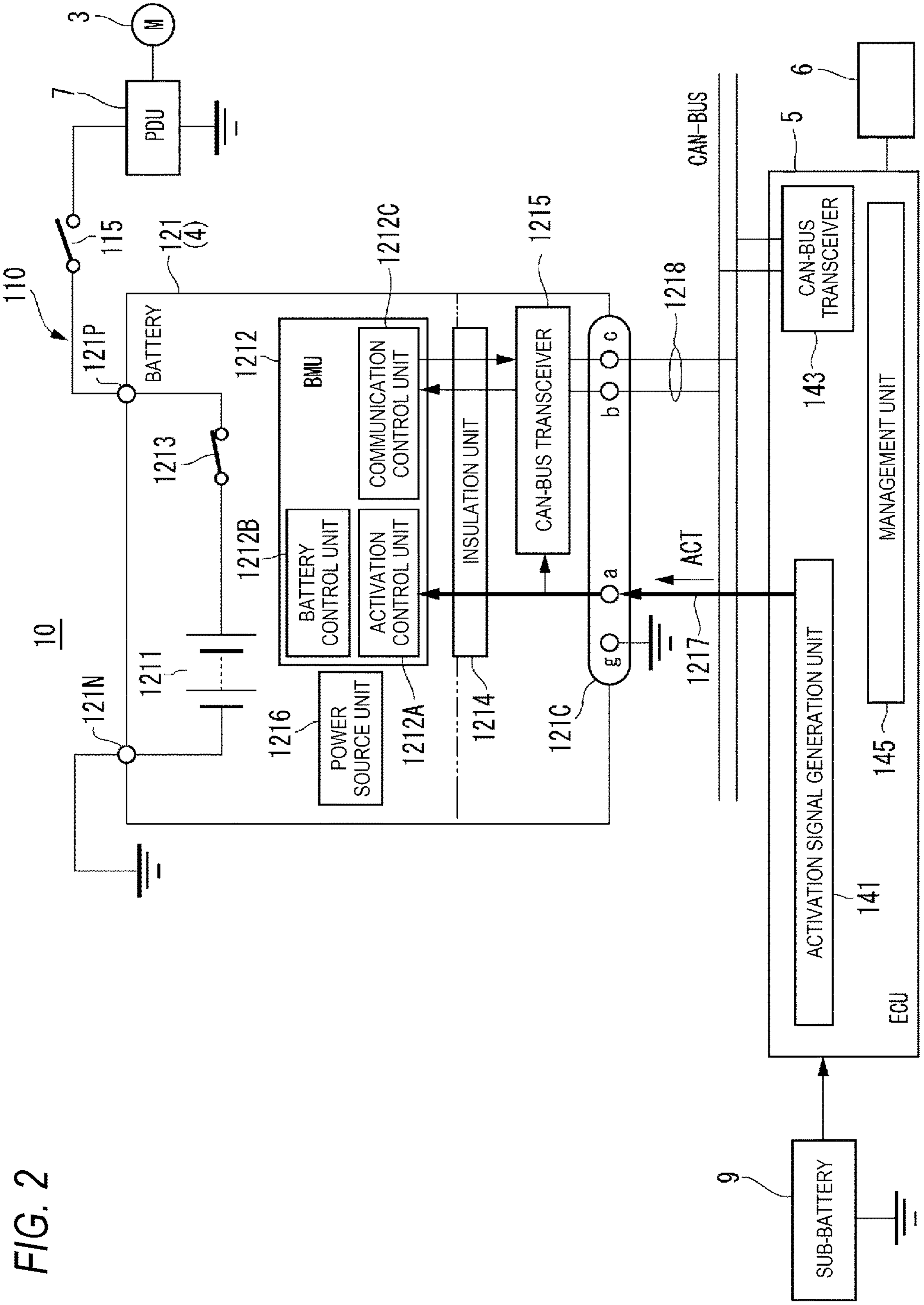
FIG. 2 is a block diagram showing a configuration of a control system 10 of the vehicle 1 of FIG. 1.

FIG. 2 is a block diagram showing a configuration of the control system 10.

The control system 10 includes the electric circuit 110, the power storage device 4, the PDU 7, the ECU 5, and a sub-battery 9. The electric circuit 110 electrically connects the power storage device 4, a contactor 115, and the PDU 7. In the connection shown in FIG. 2, an example in which the power storage device 4, the contactor 115, and the PDU 7 are connected in series is shown.

At least the power storage device 4 and the ECU 5 are connected to a CAN-BUS (a communication line) and communicate with each other via the CAN-BUS. For example, a signal transmitted from the ECU 5 is propagated by the CAN-BUS to devices such as the power storage device 4 and the PDU 7 capable of receiving the signal.

The power storage device 4 includes, for example, a battery 121. The power storage device 4 generates a predetermined voltage (for example, a nominal voltage thereof is 48 V) by connecting a plurality of cells such as a lithium ion battery, a nickel hydrogen battery, and a lead battery in series. A power from the battery 121 is supplied to the PDU 7 controlling an output of the motor 3 via the electric circuit 110, and for example, is converted from direct current to three-phase alternating current by the PDU 7, and then supplied to the motor 3 that is a three-phase alternating current motor. The PDU 7 is a so-called inverter.

An output voltage of the battery 121 is stepped down to a low voltage (for example, 12 V) by a DC-DC converter (not shown), and is supplied to control system components such as the ECU 5 and the sub-battery 9.

The battery 121 can be charged by, for example, the charging device 8 connected to a power source of AC 100 V.

The contactor 115 is provided between a high potential side terminal 121P of the battery 121 and the PDU 7. The contactor 115 electrically connects the high potential side terminal 122P of the battery 121 and the PDU 7, and disconnects the electrical connection. The contactor 115 connects the power storage device 4 to the PDU 7 in a conductive state. The contactor 115 releases the connection between the power storage device 4 and the PDU 7 in a blocking state.

The battery 121 includes a power storage unit 1211, a battery managing unit (BMU) 1212, a bidirectional switch 1213, an insulation unit 1214, a CAN-BUS transceiver 1215 (hereinafter, referred to as the transceiver 1215), a power source unit 1216, the high potential side terminal 121P, a low potential side terminal 121N, and a connector 121C, and these components are accommodated in a housing 40 (see FIG. 1).

The power storage unit 1211 forms a secondary battery including a plurality of cells connected in series.

The bidirectional switch 1213 is provided on a power transmission path between the power storage unit 1211 and the PDU 7, and the conductive state is determined by a control of the BMU 1212 managing the battery 121. The bidirectional switch 1213 is, for example, a field effect transistor (FET), a contactor, or a relay.

The BMU 1212, which will be described in detail later, senses a state of the power storage unit 1211 and notifies the ECU 5 or the like of the sensed state. An operation state of the BMU 1212 is determined by a control of the ECU 5 or the like, and the BMU 1212 controls the conductive state of the bidirectional switch 1213 in accordance with the determined operation state. The BMU 1212 monitors a state of charge and discharge of the battery, a power storage amount of a battery main body, a temperature, and the like. A monitoring result is shared with the ECU 5. The BMU restricts charge and discharge of the power storage unit 1211 and the like by controlling the bidirectional switch 1213 and the like based on a control command from the ECU 5 to be described later or the above-described monitoring result.

The insulation unit 1214 includes an optical coupler or the like. The insulation unit 1214 electrically insulates a BMU 1212 side and a connector 121C side for a signal between the BMU 1212 and the connector 121C. For example, the insulation unit 1214 electrically insulates and converts an activation signal ACT supplied from a terminal a of the connector 121C to the BMU 1212, and supplies the converted activation signal ACT to the BMU 1212. The terminal a of the connector 121C connected to the insulation unit 1214 is connected to the ECU 5 via an activation signal transmission line 1217. The insulation unit 1214 is provided between the BMU 1212 and the transceiver 1215. The insulation unit 1214 electrically insulates and converts a signal between the BMU 1212 and the transceiver 1215.

The transceiver 1215 converts a signal used for communication between the BMU 1212 and the ECU 5 and bidirectionally relays the converted signal. For example, the ECU 5 and the power storage device 4 communicate with each other via the CAN-BUS in accordance with a CAN standard. In this case, the transceiver 1215 is provided on the connector 121C side with respect to the insulation unit 1214. Terminals b and c of the connector 121C connected to the transceiver 1215 are connected to the CAN-BUS via a CAN communication line 1218. The transceiver 1215 satisfies an electrical connection condition (a physical condition of the CAN standard) with the CAN-BUS.

The power source unit 1216 receives power supply from the power storage unit 1211, and supplies a part of the power to the BMU 1212, the insulation unit 1214, and the like. That is, the power source unit 1216 is provided on a power storage unit 1211 side with respect to the insulation unit 1214, and is electrically insulated from the connector 121C side.

As described above, the BMU 1212 functioning by the power of the battery 121 and the transceiver 1215 are electrically insulated from each other by the insulation unit 1214.

The high potential side terminal 121P is a positive electrode of the battery 121. The low potential side terminal 121N is a negative electrode of the battery 121. When the bidirectional switch 1213 is in the conductive state, a desired voltage is generated between the high potential side terminal 121P and the low potential side terminal 121N.

The connector 121C includes a plurality of signal terminals for transmitting and receiving signals for controlling the battery 121. For example, the signals transmitted and received via the connector 121C include the activation signal ACT for activating the battery 121 and a signal for the BMU 1212 to communicate with the ECU 5. The connector 121C includes a ground terminal and the like in addition to these signal terminals. The connector 121C is an example of a case where an electrical signal is transmitted and received, and the connector 121C is not limited thereto, and may transmit and receive a signal optically.

[ECU]

The ECU 5 includes an activation signal generation unit 141, a CAN-BUS transceiver 143 (hereinafter referred to as the transceiver 143), and a management unit 145.

The activation signal generation unit 141 generates the activation signal ACT for making the power storage device 4 available. The activation signal generation unit 141 supplies the generated activation signal ACT to the battery 121 via the activation signal transmission line 1217.

It is assumed that the activation signal generation unit 141 indicates that the activation signal ACT is in a significant state with a voltage equivalent to a voltage supplied from a sub-battery 9 to the ECU 5. That is, when the activation signal generation unit 141 indicates the significant state of the activation signal ACT, the activation signal generation unit 141 outputs the voltage equivalent to the voltage supplied from the sub-battery 160 to the ECU 5. For example, the activation signal generation unit 141 may include a switch (not shown), and generate the activation signal ACT by controlling a conductive state of the switch.

The transceiver 143 converts a signal used for communication or the like between the BMU 1212 and the ECU 5 and bidirectionally relays the converted signal. For example, the ECU 5 and the power storage device 4 communicate with each other via the CAN-BUS in accordance with the CAN standard. In this case, the transceiver 143 satisfies the electrical connection condition (the physical condition of the CAN standard) with the CAN-BUS.

The management unit 145 associates the battery 120 that receives the activation signal ACT with identification information of the battery 120, and assigns the identification information to each battery 120. The management unit 145 transmits the identification information of the battery 120 to the BMU 1212 via the transceiver 1215 activated by the activation signal ACT. After completing an initialization process of the battery 120, the management unit 145 controls the contactor 115, the battery 120, the PDU 130, and the like based on information of an output requirement input to the ECU 5.

The ECU 5 can restrict charge and discharge of the power storage device 4 by controlling the power storage device 4.

The ECU 5 limits power supply to the power storage device 4 by controlling the contactor 115. The ECU 5 controls driving of the motor 3 by controlling a power supplied to the motor 3 by the PDU 7.

[BMU]

As shown in FIG. 2, the BMU 1212 includes an activation control unit 1212A, a battery control unit 1212B, and a communication control unit 1212C.

The activation control unit 1212A sets, based on the activation signal ACT supplied from the ECU 5, a state of the battery 121 to an activation state in which a power can be output. For example, the activation control unit 1212A senses that the activation signal ACT is in the significant state, and sets the state of the battery 121 to the activation state in which the power can be output. The activation control unit 1212A senses that the activation signal ACT is in an insignificant state, and sets the state of the battery 121 to a non-activation state in which no power is output.

The communication control unit 1212C communicates with the ECU 5 according to a predetermined protocol. For example, the communication control unit 1212C communicates information for controlling the charge and discharge of the battery 121 with the ECU 5. The ECU 5 transmits the identification information for identifying the battery 121, and the communication control unit 1212C stores the identification information notified from the ECU 5 in a storage area (not shown) in the BMU.

The battery control unit 1212B, which will be described in detail later, for example, senses a change in a state (a voltage, a SOC, or the like) of each cell of the power storage unit 1211, and manages an upper limit voltage that is an upper limit power value which is an upper limit of a power output from the power storage unit 1211. The battery control unit 1212B controls the bidirectional switch 1213 to make the battery 121 available.

[Power Storage Device Protection Control]

Next, a power storage device protection control by the BMU 1212 and the ECU 5 will be described.

Each functional unit of the BMU 1212 and the ECU 5 is realized by, for example, a central processing unit (CPU) executing a predetermined program (software). A part or all of the functional units of the BMU 1212 and the ECU 5 may be realized by hardware such as a large scale integration (LSI), an application specific integrated circuit (ASIC), a field-programmable gate array (FPGA), and a graphics processing unit (GPU). Further, a part or all of the functional units of the BMU 1212 and the ECU 5 may be realized by cooperation of software and hardware.

Figure 3:
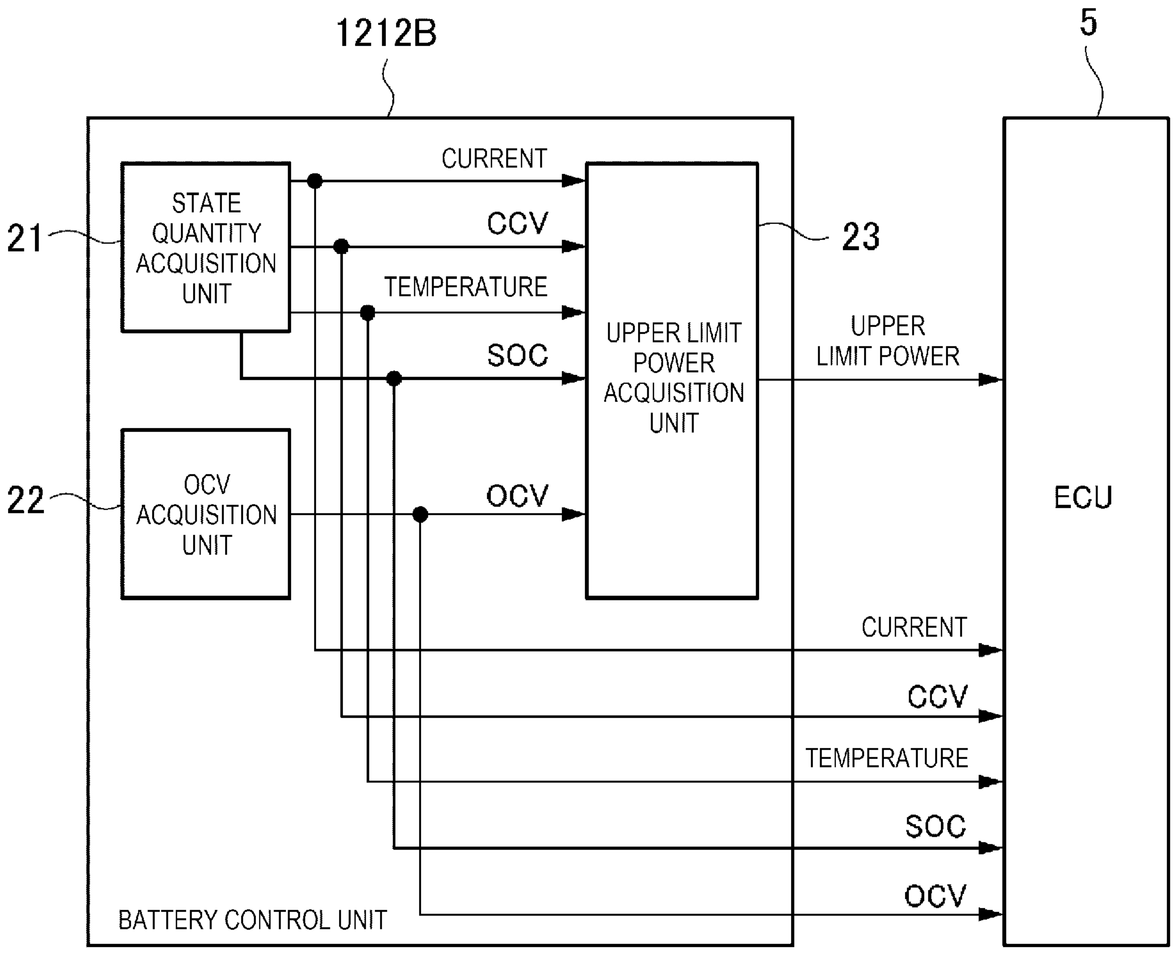
FIG. 3 is a block diagram showing a configuration of a battery control unit 1212B of a BMU 1212.

As shown in FIG. 3, the battery control unit 1212B includes a state quantity acquisition unit 21, an OCV acquisition unit 22, and an upper limit power acquisition unit 23 as a functional configuration. In the present invention, acquisition is a concept including detection, sense, calculation, estimation, and the like.

The state quantity acquisition unit 21 acquires a current of the electric circuit 110, a closed circuit voltage (CCV) when the contactor 115 is in the conductive state, a temperature of the power storage unit 1211, and a state of charge (SOC) of the power storage unit 1211. The acquired current value, CCV, temperature, and SOC are output to the upper limit power acquisition unit 23 and transmitted to the ECU 5 via the CAN-BUS.

The OCV acquisition unit 22 acquires an open circuit voltage (OCV) of the power storage unit 1211. The acquired OCV is output to the upper limit power acquisition unit 23 and is transmitted to the ECU 5 via the CAN-BUS.

The upper limit power acquisition unit 23 acquires, based on state quantity information of the power storage unit 1211 input from the state quantity acquisition unit 21 and the OCV acquisition unit 22, an upper limit power that is an upper limit of a power output from the power storage unit 1211 or a power input to the power storage unit 1211. In the following description, an upper limit power at the time of discharge will be described, and the same applies to an upper limit power at the time of charge.

Figure 4:
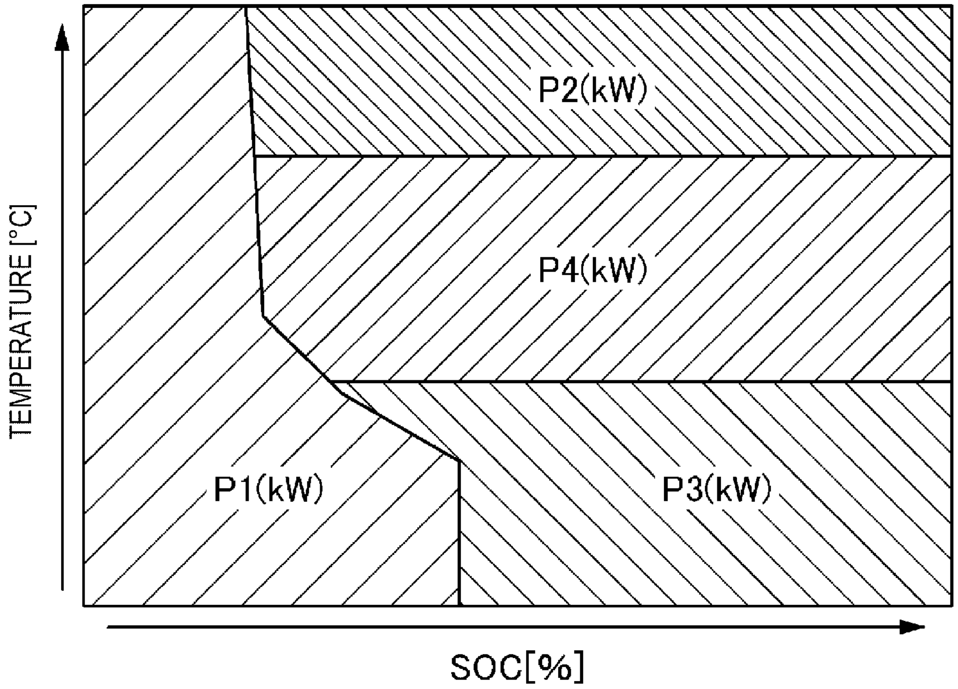
FIG. 4 is a diagram showing an upper limit power map.

For example, the upper limit power acquisition unit 23 acquires the upper limit power using an upper limit power map indicating a relationship between the SOC, the temperature and the upper limit power as shown in FIG. 4. In FIG. 4, P1 to P4 (kW) indicate the upper limit power, and for example, P4 (kW)>P3 (kW)>P2 (kW)>P1 (kW). The acquired upper limit power is transmitted to the ECU 5 via the CAN-BUS. The battery control unit 1212B may store the upper limit power in the storage area (not shown) in the BMU in a readable manner by the ECU 5. The upper limit power acquisition unit 23 may calculate the upper limit power based on the state quantity information of the power storage unit 1211 using a preset calculation expression. The BMU 1212B may include not only the upper limit power acquisition unit 23 acquiring the upper limit power, but also a lower limit power acquisition unit acquiring a lower limit power that is a lower limit of the power output from the power storage unit 1211 or the power input to the power storage unit 1211.

Figure 5:
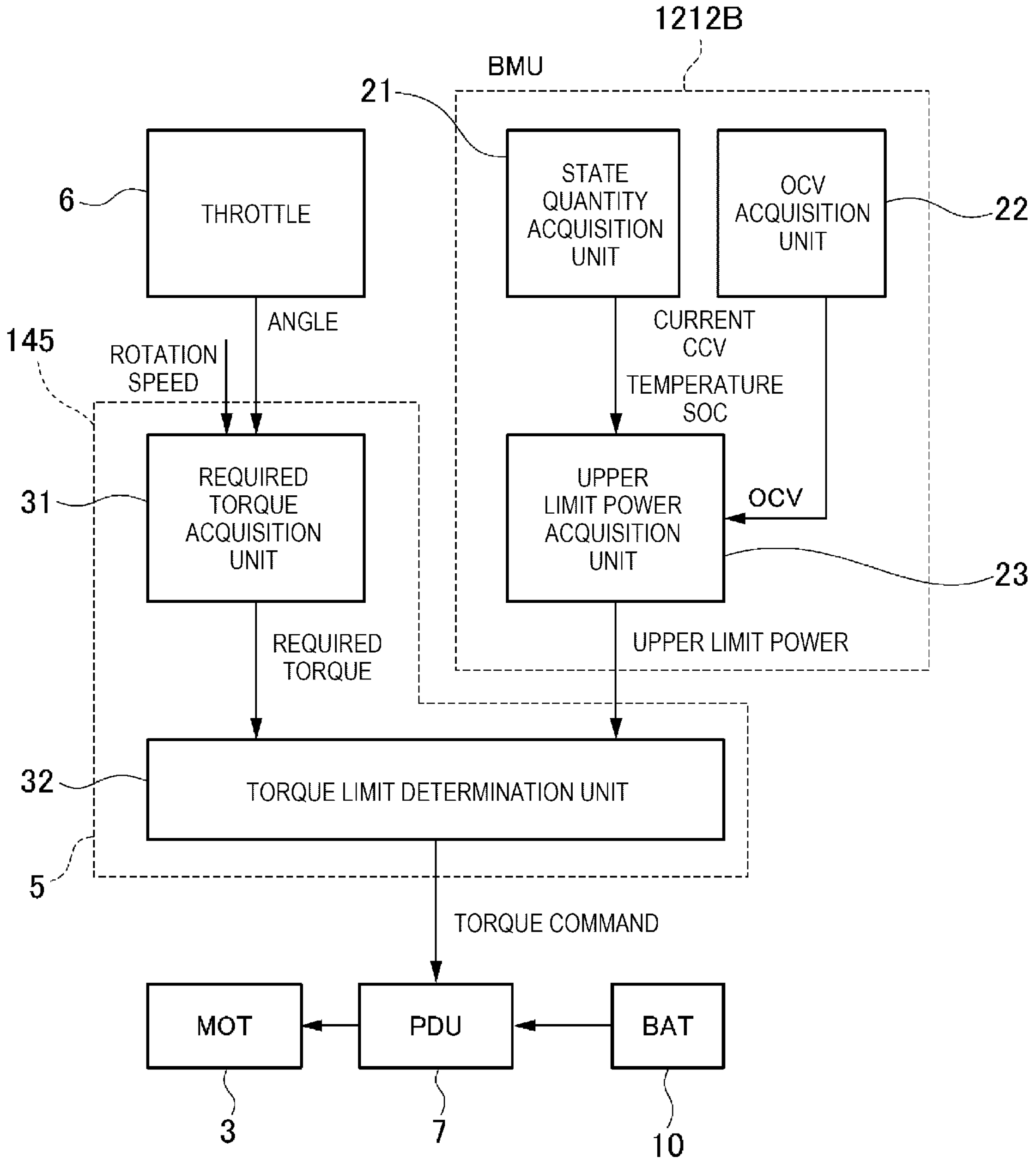
FIG. 5 is a block diagram showing a relationship between the battery control unit 1212B of the BMU 1212 and a management unit 145 of an ECU 5 in a power storage device protection control.

As shown in FIG. 5, the management unit 145 of the ECU 5 includes a required torque acquisition unit 31 and a torque limit determination unit 32 as a functional configuration.

The required torque acquisition unit 31 acquires a required torque for the motor 3 based on throttle angle information input from the throttle 6 and a rotation speed of the wheel 2 input from a rotation speed sensor or the like. The required torque acquisition unit 31 acquires the required torque using, for example, a required torque map indicating a relationship between the throttle angle, the wheel rotation speed and the required torque. The acquired required torque is output to the torque limit determination unit 32.

The torque limit determination unit 32 receives the required torque from the required torque acquisition unit 31 and receives the upper limit power from the battery control unit 1212B of the power storage device 4. When the battery control unit 1212B stores the upper limit power in the storage area (not shown) in the BMU, the torque limit determination unit 32 goes to obtain the upper limit power instead of receiving the upper limit power. The torque limit determination unit 32 determines an output torque based on the acquired required torque and upper limit power, and outputs the output torque as a torque command to the PDU 7.

According to such a power storage device 4, the power storage device 4 holds the upper limit power, and thus a situation can be prevented in which the power storage device 4 is used in excess of the upper limit power, and a life of the power storage device 4 can be extended. That is, when an upper limit power is set on an apparatus side to which a power storage device is mounted, there is no problem in using only a power storage device having a fixed specification, but when a power storage device having an unclear performance is used or when a power storage device having a different performance every time the power storage device is mounted is used, it is assumed that a power storage device is used in excess of an upper limit power, and deterioration of the power storage device is accelerated. As in the above-described embodiment, the power storage device 4 acquires the upper limit power and transmits the upper limit power to the apparatus side, so that the situation can be prevented in which the power storage device 4 is used in excess of the upper limit power.

When a power storage device that holds an upper limit power is generally used, an apparatus to which the power storage device is mounted may be driven and controlled according to the upper limit power of the power storage device, and a work such as rewriting a program in accordance with a specification of the power storage device is unnecessary. Accordingly, types of apparatuses to which the power storage device 4 is mounted increase, and development of a battery sharing service is expected.

First Modification

Figure 6:
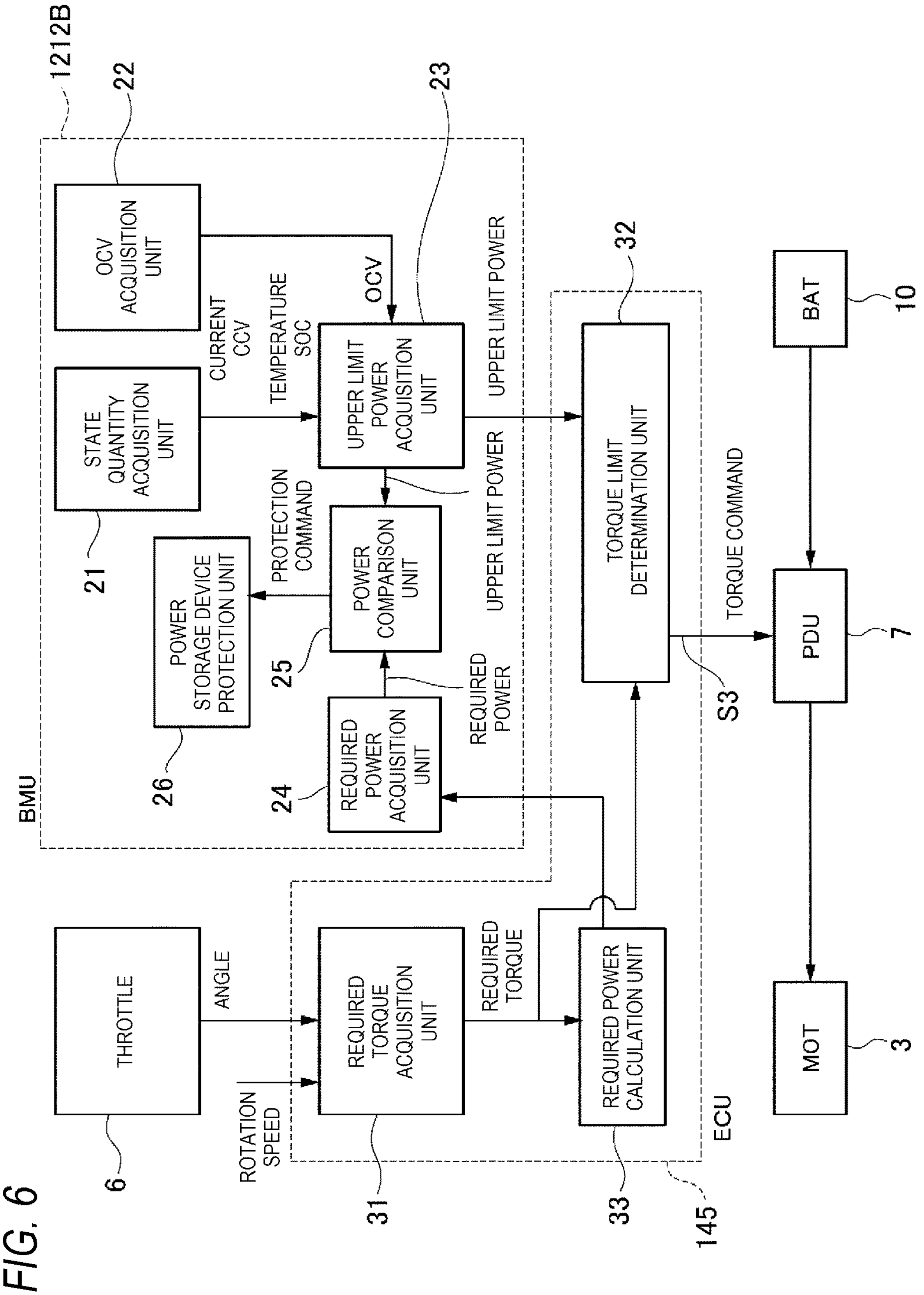
FIG. 6 is a block diagram showing a relationship between the battery control unit 1212B of the BMU 1212 and the management unit 145 of the ECU 5 in a power storage device protection control according to a first modification.

FIG. 6 is a block diagram related to a power storage device protection control of a first modification of the first embodiment.

The ECU 5 of the first modification includes a required power calculation unit 33 in addition to the required torque acquisition unit 31 and the torque limit determination unit 32. The required torque acquisition unit 31 outputs the acquired required torque to the required power calculation unit 33 and the torque limit determination unit 32. The required power calculation unit 33 calculates a required power correlated with a power requirement of the motor 3 to the power storage device 4 based on the required torque acquired by the required torque acquisition unit 31.

The battery control unit 1212B of the BMU 1212 includes a required power acquisition unit 24, a power comparison unit 25, and a power storage device protection unit 26 in addition to the state quantity acquisition unit 21, the OCV acquisition unit 22, and the upper limit power acquisition unit 23. The required power acquisition unit 24 acquires the required power from the required power calculation unit 33 of the ECU 5 via the CAN-BUS. That is, the required power acquisition unit 24 acquires the required power of the motor 3 to the power storage device 4 based on an input (throttle rotation) of a user of the vehicle 1 to which the motor 3 is equipped. The power comparison unit 25 acquires the upper limit power acquired by the upper limit power acquisition unit 23, and compares the required power acquired by the required power acquisition unit 24 with the upper limit power acquired from the upper limit power acquisition unit 23.

As a result, when the required power acquired by the required power acquisition unit 24 exceeds or is predicted to exceed the upper limit power acquired from the upper limit power acquisition unit 23, the power storage device protection unit 26 blocks the power transmission path between the power storage unit 1211 and the PDU 7 by the bidirectional switch 1213. Instead of blocking the power transmission path between the power storage unit 1211 and the PDU 7 by the bidirectional switch 1213, the power storage device protection unit 26 may prohibit a discharge process from the battery 121 or may restrict the power output from the battery 121 so as not to exceed the upper limit power. In the vehicle 1 of the present embodiment, when it is not preferable for a vehicle behavior to block the power transmission path between the power storage unit 1211 and the PDU 7, for example, when a vehicle speed is equal to or higher than a predetermined speed, it is preferable to reserve the block for a predetermined time According to the present modification, the power storage device protection unit 26 can block the power transmission path between the power storage unit 1211 and the PDU 7 regardless of a determination of the torque limit determination unit 32, and thus the situation can be avoided more reliably in which the power storage device 4 is used in excess of the upper limit power.

Second Modification

FIG. 7 is a block diagram related to a power storage device protection control of a second modification of the first embodiment.

Similarly to the first modification, the ECU 5 of the second modification includes the required power calculation unit 33 in addition to the required torque acquisition unit 31 and the torque limit determination unit 32. The required torque acquisition unit 31 outputs the acquired required torque to the required power calculation unit 33 and the torque limit determination unit 32. The required power calculation unit 33 calculates a required power correlated with a power requirement of the motor 3 to the power storage device 4 based on the required torque acquired by the required torque acquisition unit 31.

Similarly to the first modification, the battery control unit 1212B of the BMU 1212 of the second modification includes the required power acquisition unit 24, the power comparison unit 25, and the power storage device protection unit 26 in addition to the state quantity acquisition unit 21, the OCV acquisition unit 22, and the upper limit power acquisition unit 23, and further includes a response unit 27. The required power acquisition unit 24 acquires the required power from the required power calculation unit 33 of the ECU 5 via the CAN-BUS. The power comparison unit 25 acquires the upper limit power acquired by the upper limit power acquisition unit 23, and compares the required power acquired by the required power acquisition unit 24 with the upper limit power acquired from the upper limit power acquisition unit 23.

As a result, when the required power acquired by the required power acquisition unit 24 exceeds or is predicted to exceed the upper limit power acquired from the upper limit power acquisition unit 23, the response unit 27 responds to the torque limit determination unit 32 to decrease the required power.

When the torque limit determination unit 32 does not respond to the response from the response unit 27, that is, when a power higher than the upper limit power is output or is predicted to output from the battery 121, the power storage device protection unit 26 blocks the power transmission path between the power storage unit 1211 and the PDU 7 by the bidirectional switch 1213. Instead of blocking the power transmission path between the power storage unit 1211 and the PDU 7 by the bidirectional switch 1213, the power storage device protection unit 26 may prohibit the discharge process from the battery 121 or may restrict the power output from the battery 121 so as not to exceed the upper limit power. In the vehicle 1 of the present embodiment, when it is not preferable for a vehicle behavior to block the power transmission path between the power storage unit 1211 and the PDU 7, it is preferable to reserve the block for a predetermined time Second Embodiment Next, the vehicle 1 according to the second embodiment will be described.

Figure 8:
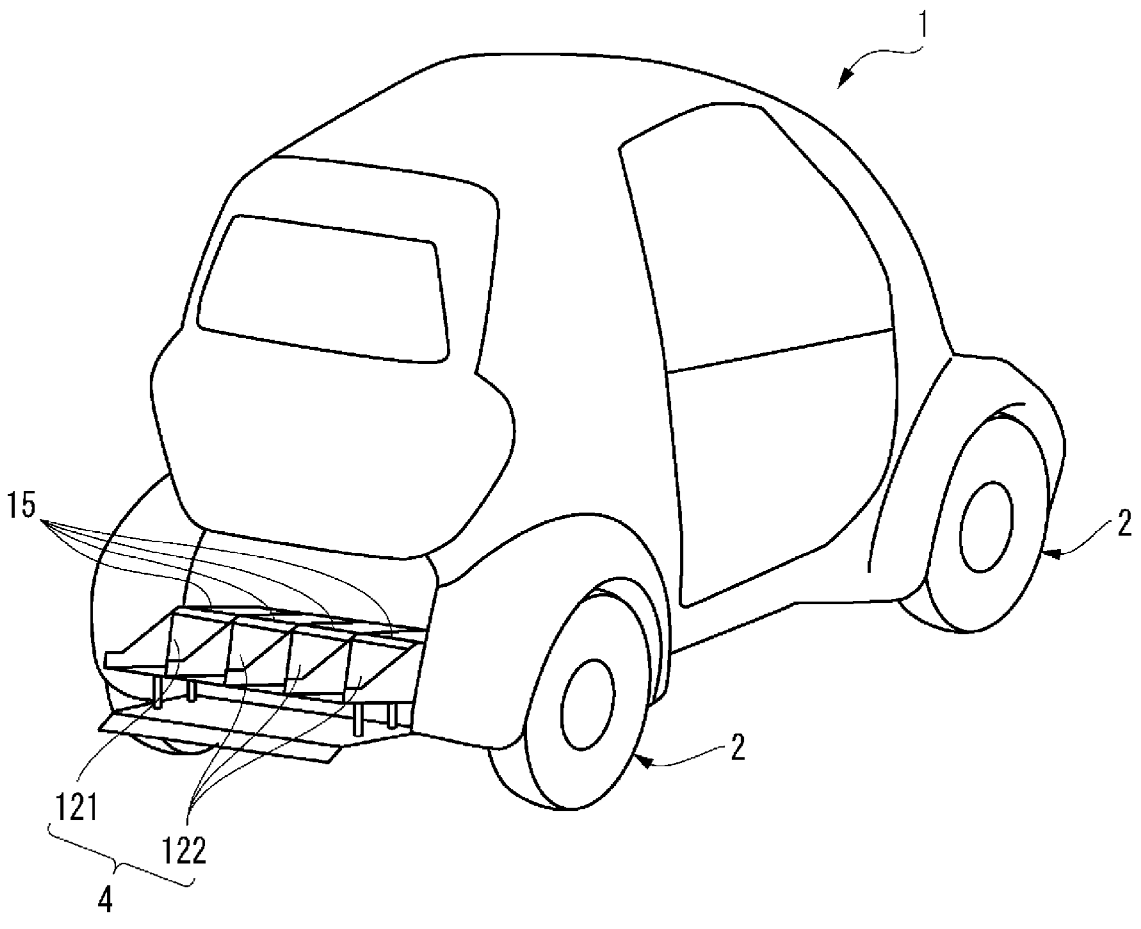
FIG. 8 is a schematic side view showing the vehicle 1 (an electric vehicle) according to a second embodiment of the present invention.
Figure 9:
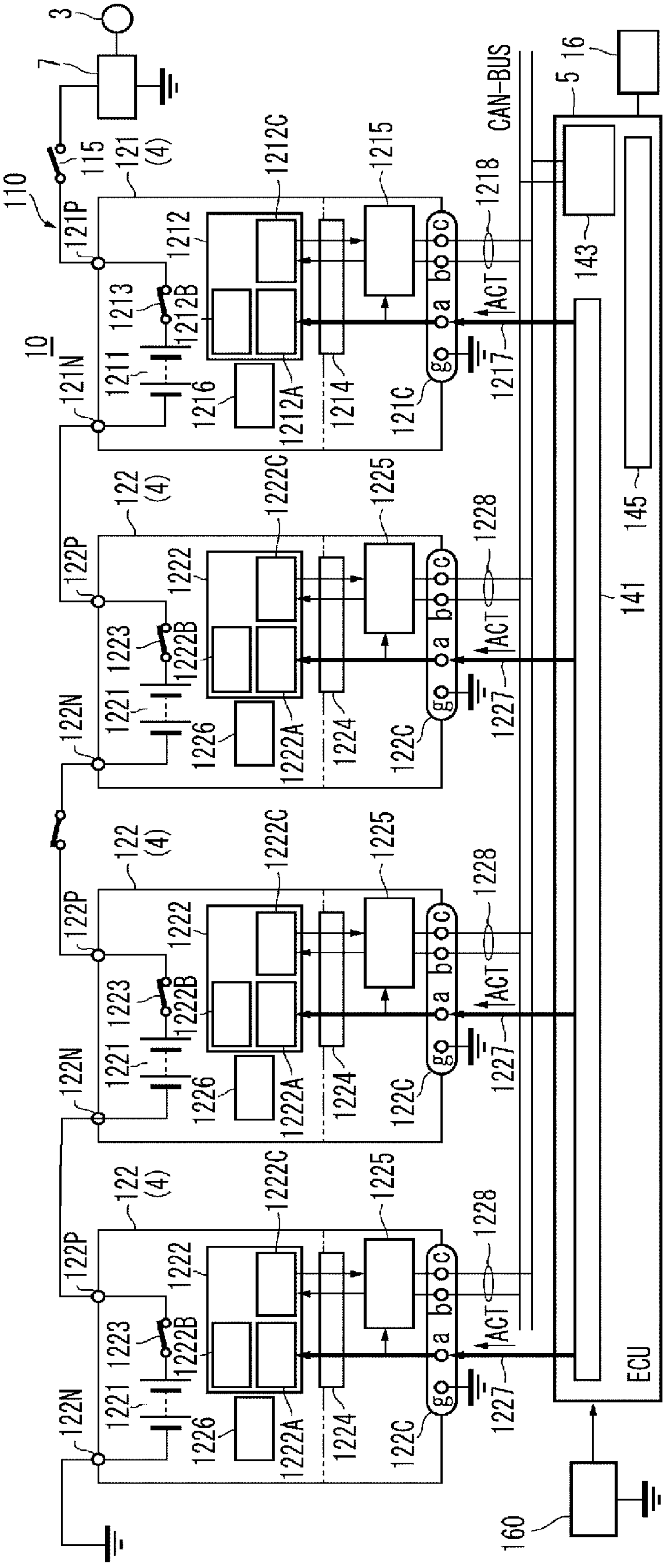
FIG. 9 is a block diagram showing a configuration of the control system 10 of the vehicle 1 of FIG. 8.

As shown in FIGS. 8 and 9, the vehicle 1 of the present embodiment is an electric vehicle that includes the motor 3 mechanically connected to front wheels and/or rear wheels among four wheels 2 and driving the wheels 2, the detachable power storage device 4 provided to be electrically connectable to the motor 3 and supplying a driving power of the motor 3, the battery mounting units 15 to which the power storage device 4 is mounted, the electric control unit (ECU) 5 controlling the motor 3, an accelerator pedal 16 operated by an occupant, the power drive unit (PDU) 7 driving the motor 3 in response to a torque command from the ECU 5, and a charging device (not shown) charging the power storage device 4. The vehicle 1 travels by driving the motor 3 with the PDU 7 by a power supplied from the power storage device 4 including a plurality of (four in the present embodiment) batteries via the electric circuit 110, and transmitting a rotational power when the motor 3 is driven to the wheels 2. A state of the equipped power storage device 4 is managed by the control system 10.

The four batteries are mounted to four battery mounting units 15 arranged in a horizontal row in a rear portion of the vehicle 1, respectively. It is not always necessary to mount all of the four batteries.

The control system 10 is basically the same as the control system 10 of the first embodiment, but differences will be mainly described because the power storage device 4 includes the plurality of (four in the present embodiment) batteries.

The activation signal transmission lines 1217 and 1227 for supplying the activation signal ACT are different wires for individual batteries. Accordingly, the activation signal generation unit 141 can individually activate (start) the batteries. The management unit 145 assigns identification information to each battery, and transmits the identification information of the battery to the communication control units 1212C and 1222C of the BMUs 1212 and 1222 via the transceivers 1215 and 1225 activated by the activation signal ACT, respectively.

The identification information includes information indicating whether the battery is a master battery or a slave battery, and order information. The order information may be, for example, a priority order or a subordinate order, and is superiority or inferiority for convenience in management and does not indicate superiority or inferiority of performance or the like. The information indicating whether the battery is the master battery or the slave battery is preferably associated with the order information.

For example, the batteries mounted to the four battery mounting units 15 are numbered as No. 1, No. 2, No. 3, and No. 4 in ascending order from a left, the battery of No. 1 is used as the master battery, and the remaining batteries are used as the slave batteries. The information indicating whether the battery is the master battery or the slave battery is associated with the order information, so that a load on the management unit 145 is reduced.

Based on the identification information supplied from the ECU 5, the battery acquires its own order information and information indicating whether the battery is the master battery or the slave battery associated with the order information. In addition to the identification information, the battery also acquires information on the number of batteries equipped, whether the batteries are connected in parallel, connected in series, or a combination thereof.

The four batteries of the power storage device 4 have the same configuration. That is, the master battery 121 includes the power storage unit 1211, the battery managing unit (BMU) 1212, the bidirectional switch 1213, the insulation unit 1214, the transceiver 1215, the power source unit 1216, the high potential side terminal 121P, the low potential side terminal 121N, and the connector 121C, and these components are accommodated in a housing. Each slave battery 122 includes a power storage unit 1221, the battery managing unit (BMU) 1222, a bidirectional switch 1223, an insulation unit 1224, the CAN-BUS transceiver 1225 (hereinafter referred to as the transceiver 1225), a power source unit 1226, a high potential side terminal 122P, a low potential side terminal 122N, and a connector 122C, and these components are accommodated in the housing.

A BMU of the master battery 121 is the master BMU 1212, and a BMU of the slave battery 122 is the slave BMU 1222. The master BMU 1212 aggregates information from the slave BMUs 1222 and communicates with the ECU 5. The master BMU 1212 and the slave BMUs 1222 may communicate via the CAN-BUS, or may include a wireless communication unit in which the batteries 121 and 122 can wirelessly transmit and receive information to and from each other, and may communicate via the wireless communication unit. By providing the wireless communication unit, accurate and stable communication can be performed without depending on the CAN-BUS.

The upper limit power acquisition unit 23 of the master BMU 1212 functions as an entire upper limit power acquisition unit that acquires an entire upper limit power which is an upper limit of a power output from the entire power storage device 4. That is, the upper limit power acquisition unit 23 of the slave battery 122 acquires an upper limit power of the slave battery and transmits the acquired upper limit power to the upper limit power acquisition unit 23 of the master BMU 1212. The upper limit power acquisition unit 23 of the master BMU 1212 acquires an upper limit power of the master BMU 1212 and acquires an entire upper limit power based on the upper limit power of the slave battery 122 acquired from the upper limit power acquisition unit 23 of the slave battery 122. Hereinafter, a method of calculating the entire upper limit power will be described by generalizing the number of batteries.

Figure 10:
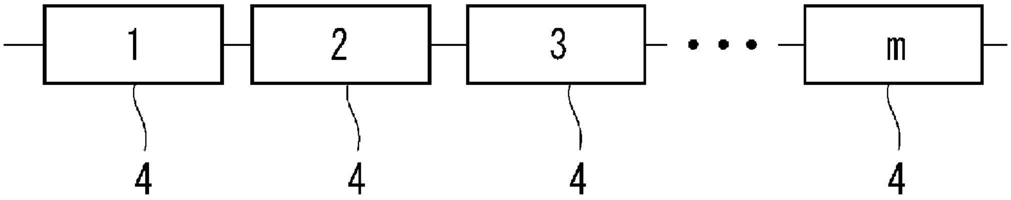
FIG. 10 is a diagram showing a state in which m batteries of a power storage device 4 are connected in series.

When m batteries are connected in series as shown in FIG. 10, an entire upper limit power ($PW_{limit\ series}$) is expressed by the following equation (1).

[Equation 1]

$$PW_{limit\ series} = \mathrm{Min}(PW_{lim_1}, PW_{lim2}, \ldots, PW_{limm}) \times m \tag{1}$$

That is, the upper limit power acquisition unit 23 of the master BMU 1212 calculates the entire upper limit power ($PW_{limit\ series}$) by multiplying a smallest upper limit power (Min ($PW_{lim1}$, $PW_{lim2}$, . . . . $PW_{limm}$)) of upper limit powers ($PW_{limm}$) of the respective batteries by the number of batteries (m) connected in series.

Figure 11:
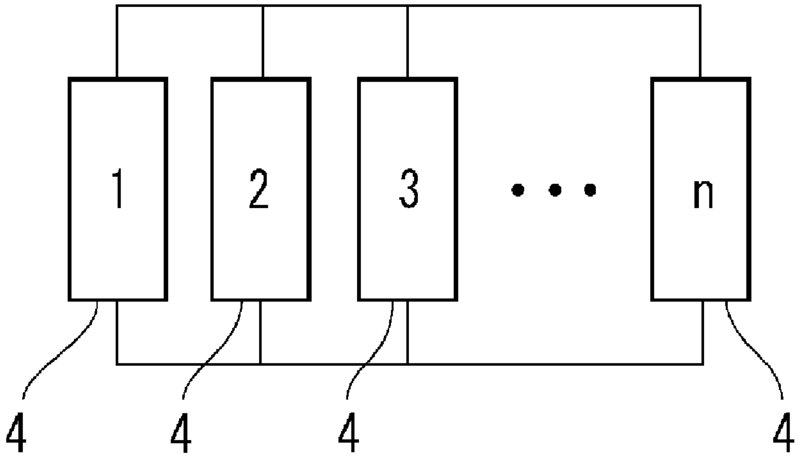
FIG. 11 is a diagram showing a state in which n batteries of the power storage device 4 are connected in parallel.

When n batteries are connected in parallel as shown in FIG. 11, an entire upper limit power ($PW_{limit\ parallel}$) is expressed by the following equation (2).

[Equation 2]

$$PW_{limit\ parallel} = \mathrm{Min}(PW_{lim_1}, PW_{lim2}, \ldots, PW_{limn}) \times n \times \frac{\left|\sum_{i=1}^{n} I_n\right|}{\mathrm{Max}(|I_1|, |I_2|, \ldots, |I_n|) \times n} \tag{2}$$

That is, the upper limit power acquisition unit 23 of the master BMU 1212 multiplies a smallest upper limit power (Min ($PW_{lim1}$, $PW_{lim2}$, . . . , $PW_{limm}$)) of upper limit powers of the respective batteries by the number of batteries (n) connected in parallel. Further, a sum of currents $$\left(\left|\sum_{i=1}^{n} I_n\right|\right)$$

of the batteries is divided by a value obtained by multiplying a largest current (Max ($|I_1|$, $|I_2|$, . . . , $|I_n|$) of currents ($I_n$) of the respective batteries by the number of batteries (n)

connected in parallel. Then, the entire upper limit power ($PW_{limit\ parallel}$) is calculated by multiplying the obtained values.

When a battery connected in parallel fails (for example, power input/output cannot be performed), the master BMU 1212 calculates the entire upper limit power ($PW_{limit\ parallel}$) excluding the failed battery. In a case where the batteries are connected in series as shown in FIG. 10, when a bypass mechanism that bypasses a failed battery is provided in the vehicle 1, the master BMU 1212 can calculate the entire upper limit power ($PW_{limit\ parallel}$) excluding the failed battery. A failure of a battery such as inability to perform the power input/output can be recognized by a voltage sensor (not shown).

Figure 12:
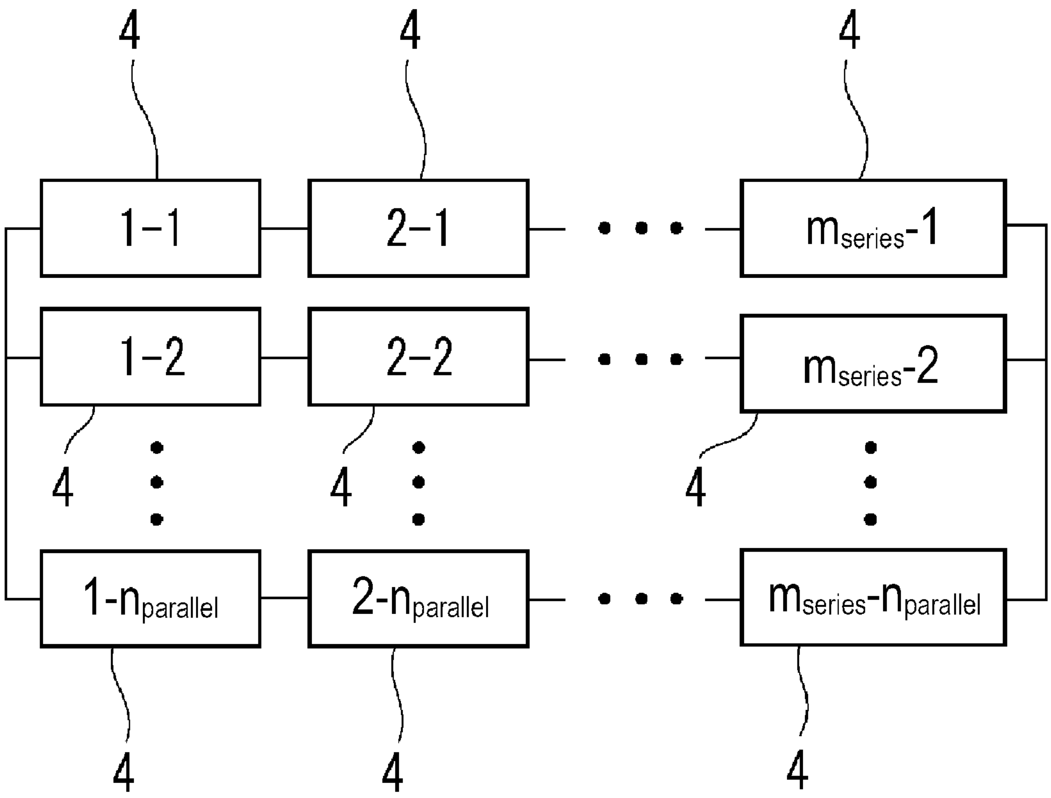
FIG. 12 is a diagram showing a state in which n series circuits in which m batteries of the power storage device 4 are connected in series are connected in parallel.

As shown in FIG. 12, when n series circuits in which m batteries are connected in series are connected in parallel, an entire upper limit power ($PW_{limit\ series\text{-}parallel}$) is expressed by the following equation (3).

[Equation 3]

$$PW_{limit\ series-parallel} = \mathrm{Min}(PW_{lim\ series\ 1}, PW_{lim\ series\ 2}, \ldots, PW_{lim\ series\ m}) \times m_{series} \times \frac{\left|\sum_{i=1}^{n} I_{aven}\right|}{\mathrm{Max}(|I_{ave1}|, |I_{ave2}|, \ldots, |I_{aven\ parallel}|) \times n_{parallel}} \quad (3)$$

That is, the upper limit power acquisition unit 23 of the master BMU 1212 multiplies a smallest upper limit power ($\mathrm{Min}\ (PW_{lim\ series\ 1}, PW_{lim\ series\ 2}, \ldots, PW_{lim\ series\ n})$) of upper limit powers ($PW_{lim\ series\ m}$) of the respective batteries of the series circuits by the number of batteries (m) connected in series. Further, a sum of average currents ($I_{aven}$) of the series circuits $$\left(\left|\sum_{i=1}^{n} I_{aven}\right|\right)$$

is divided by a value obtained by multiplying a largest average current ($\mathrm{Max}\ (|I_{ave\ 1}|, I_{ave\ 2}, \ldots, |I_{aven}|)$ of the average currents ($I_{aven}$) of the respective series circuits by the number of series circuits connected in parallel ($n_{parallel}$). Then, the entire upper limit power ($PW_{limit\ series\text{-}parallel}$) is calculated by multiplying these obtained values.

Figure 13:
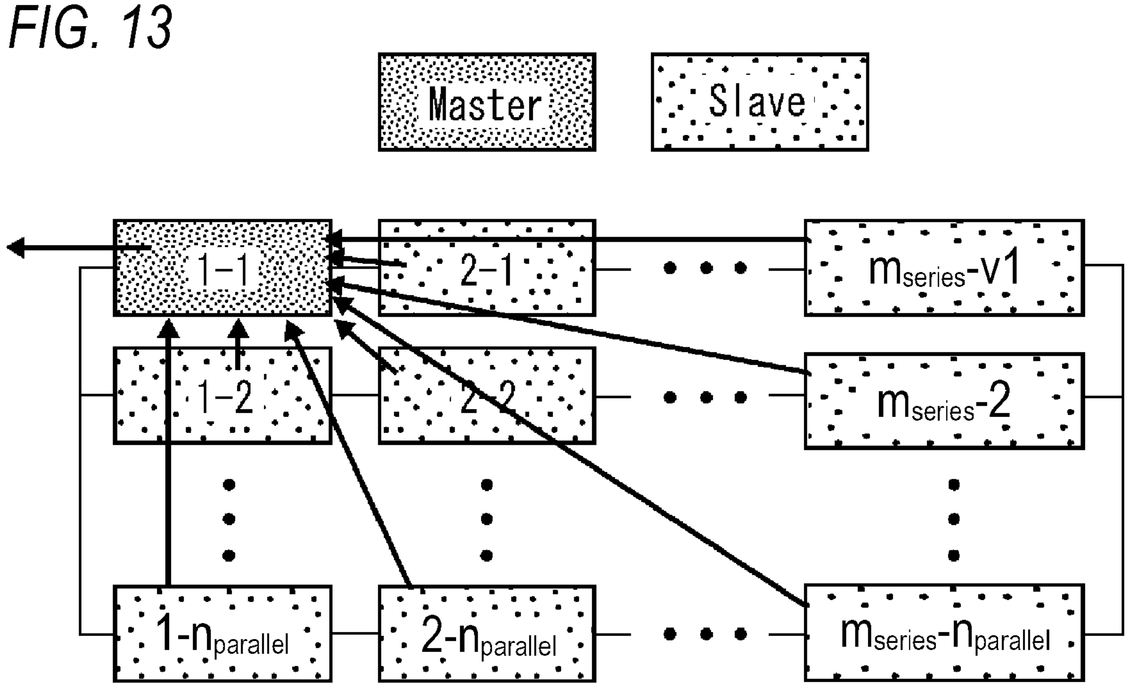
FIG. 13 is a diagram showing a relationship between a master battery and slave batteries in a battery connection mode of FIG. 12.

When n series circuits in which m batteries are connected in series are connected in parallel as shown in FIG. 12, one battery may be used as the master battery 121, and all the remaining batteries may be used as the slave batteries 122 as shown in FIG. 13, and the master BMU 1212 may receive an upper limit power from the slave BMU 1222 and calculate the entire upper limit power ($PW_{limit\ series\text{-}parallel}$) based on the above-described expression (3).

Figure 14:
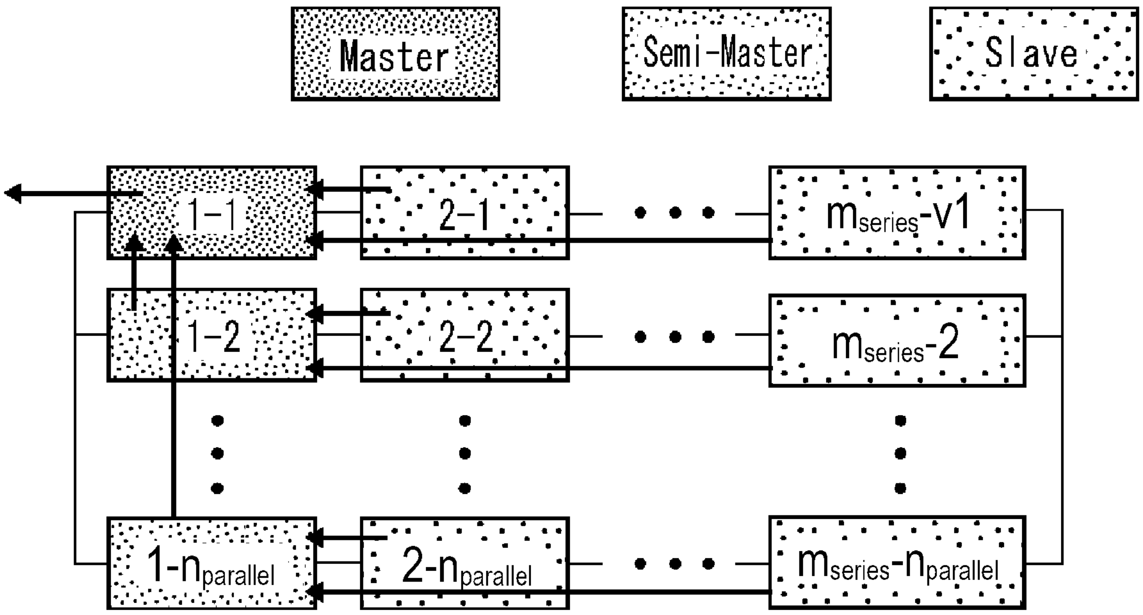
FIG. 14 is a diagram showing a relationship of the master battery, semi-master batteries, and slave batteries in the battery connection mode of FIG. 12.

As shown in FIG. 14, one of the slave batteries 122 constituting each series circuit may be used as a semi-master battery, and the BMUs 1222 of the master battery and the semi-master battery may calculate an upper limit power ($PW_{limit\ series}$) of the series circuit, and the master BMU 1212 may calculate an entire upper limit power ($PW_{limit\ series\text{-}parallel}$) based on the upper limit power ($PW_{limit\ series}$) of the series circuit received from the BMU 1222 of the semi-master battery.

In this way, even when the power storage device 4 includes a plurality of batteries, the master battery 121 holds the entire upper limit power, and thus even if an apparatus to which the power storage device 4 is mounted is changed, a situation can be avoided in which the power storage device 4 is used in excess of the entire upper limit power. Accordingly, a life of the power storage device 4 can be extended, and types of apparatuses to which the power storage device 4 is equipped increase.

The first modification of the first embodiment described above can be applied to the second embodiment. That is, the battery includes the required power acquisition unit 24, the power comparison unit 25, and the power storage device protection unit 26 in addition to the state quantity acquisition unit 21, the OCV acquisition unit 22, and the upper limit power acquisition unit 23. The required power acquisition unit 24 of the master BMU 1212 of the master battery 121 acquires a required power from the required power calculation unit 33 of the ECU 5 via the CAN-BUS. The power comparison unit 25 of the master BMU 1212 acquires an entire upper limit power acquired by the upper limit power acquisition unit 23 of the master BMU 1212, and compares the required power acquired by the required power acquisition unit 24 of the master BMU 1212 with the entire upper limit power acquired from the upper limit power acquisition unit 23 of the master BMU 1212.

As a result, when the required power exceeds or is predicted to exceed the entire upper limit power, the power storage device protection unit 26 of the master BMU 1212 blocks a power transmission path between the power storage unit 1221 and the PDU 7 by the bidirectional switch 1213 and requests protection from a battery control unit 1222B of the slave battery 1222. The power storage device protection unit 26 of the slave battery 1222 requested to perform protection blocks the power transmission path between the power storage unit 1221 and the PDU 7 by the bidirectional switch 1223.

Similarly, the second modification of the first embodiment described above can be applied to the second embodiment. The battery includes the required power acquisition unit 24, the power comparison unit 25, and the power storage device protection unit 26 in addition to the state quantity acquisition unit 21, the OCV acquisition unit 22, and the upper limit power acquisition unit 23, and further includes the response unit 27. The required power acquisition unit 24 of the master BMU 1212 of the master battery 121 acquires a required power from the required power calculation unit 33 of the ECU 5 via the CAN-BUS. The power comparison unit 25 of the master BMU 1212 acquires an entire upper limit power acquired by the upper limit power acquisition unit 23 of the master BMU 1212, and compares the required power acquired by the required power acquisition unit 24 of the master BMU 1212 with the entire upper limit power acquired from the upper limit power acquisition unit 23 of the master BMU 1212.

As a result, when the required power exceeds or is predicted to exceed the entire upper limit power, the response unit 27 of the master BMU 1212 responds to the torque limit determination unit 32 to decrease the required power. When the torque limit determination unit 32 does not respond to the response from the response unit 27, that is, when a power higher than the entire upper limit power is output or is predicted to output from the battery 121, the power storage device protection unit 26 of the master BMU 1212 blocks the power transmission path between the power storage unit 1221 and the PDU 7 by the bidirectional switch 1213 and requests protection from the battery control unit 1222B of the slave battery 1222. The power storage device protection unit 26 of the slave battery 1222 requested to perform protection blocks the power transmission path between the power storage unit 1221 and the PDU 7 by the bidirectional switch 1223.

In this way, the master BMU 1212 as a representative communicates with the ECU 5, so that communication with the ECU 5 individually from each battery is prohibited, and a load of the ECU 5 is reduced.

The batteries 121 and 122 can communicate with another battery via the respective communication control units 1212C and 1222C or the wireless communication unit, and the master BMU 1212 of the master battery 121 preferably includes an abnormality detection unit that detects an abnormality of the slave battery 122. The master BMU 1212 can detect the abnormality of the slave battery 122 based on the communication with the slave BMU 1222 via the CAN-BUS or wireless communication. Accordingly, the upper limit power acquisition unit 23 of the master BMU 1212 can acquire an entire upper limit power excluding the slave battery 122 having the abnormality as described above.

On the other hand, the slave BMU 1222 of the slave battery 122 preferably includes a monitoring unit that monitors an abnormality of the master battery 121 or receives that the master battery 121 is abnormal. The slave BMU 1222 can detect the abnormality of the master battery 121 based on the communication with the master BMU 1212 via the CAN-BUS or wireless communication. When the slave battery 122 detects that the master battery 121 is abnormal or the upper limit power acquisition unit 23 functioning as the entire upper limit power acquisition unit of the master BMU 1212 cannot acquire the entire upper limit power, the upper limit power acquisition unit 23 of the slave BMU 1222 of any of the slave batteries 122 preferably functions as a substitute entire upper limit power acquisition unit that acquires the entire upper limit power. Accordingly, even when the master battery 121 is abnormal or the like, communication with the ECU 5 of the vehicle 1 can be smoothly performed.

When the abnormality of the master battery 121 is an abnormality such as the inability to perform power input/output and a process function and a communication function are normal, the master BMU 1212 of the master battery 121 may continue the function as the entire upper limit power acquisition unit.

The battery preferably includes a self-abnormality detection unit that detects an abnormality of the battery itself through communication with another battery or the like via the CAN-BUS or wireless communication. Accordingly, the master battery 121 can monitor an abnormality of the master battery 121 itself. When the master BMU 1212 detects the abnormality of the master battery 121 itself, the master BMU 1212 can cause any of the slave batteries 122 to function as the substitute entire upper limit power acquisition unit. When it is determined that a control of the master BMU 1212 can be continued even when the abnormality of the master battery 121 itself is detected, the upper limit power acquisition unit 23 of the master BMU 1212 can continue to acquire the entire upper limit power as the entire upper limit power acquisition unit.

Although various embodiments have been described above with reference to the drawings, it is needless to say that the present invention is not limited to such examples. It is apparent to those skilled in the art that various changes and modifications can be conceived within the scope of the claims, and it is also understood that such changes and modifications belong to the technical scope of the present invention. Constituent elements in the embodiments described above may be combined freely within a range not departing from the spirit of the present invention.

In the above-described embodiments, the electric motorcycle (the first embodiment) and the electric vehicle (the second embodiment) are shown as examples of a vehicle to which a power storage device can be equipped, but the vehicle to which the power storage device can be equipped may be an electrically assisted bicycle, an electric tricycle, a hybrid vehicle, a fuel cell vehicle, or the like. Further, a power apparatus to which the power storage device is equipped is not limited to the vehicle, and may be another moving body such as an airplane or a lawn mower, or may be a power consumption device such as a charge and discharge device or a floodlight that does not move.

The battery constituting the power storage device 4 may include a current regulator, a DC-DC converter, and the like.

At least the following matters are described in the present description. Although corresponding constituent elements or the like in the above-described embodiments are shown in parentheses, the present invention is not limited thereto.

(1) A power storage device (the power storage device 4) including:

a power storage unit (the power storage unit 1211, 12221) including a plurality of cells, and a power storage control unit (BMU 1212, 1222) configured to control the power storage unit, in which the power storage control unit includes an upper limit power acquisition unit (the upper limit power acquisition unit 23) configured to acquire, based on a state (a SOC, a temperature) of the power storage unit, an upper limit power that is an upper limit of a power output from the power storage unit or a power input to the power storage unit.

According to (1), the power storage device acquires the upper limit power, so that even if an apparatus to which the power storage device is mounted is changed, a situation can be avoided in which the power storage device is used in excess of the upper limit power. Accordingly, deterioration of the power storage device can be prevented, and a life of the power storage device can be extended.

(2) The power storage device according to (1), in which the power storage device is provided to be electrically connectable to a power apparatus (the motor 3), and the power storage device further includes an upper limit notification unit (the communication control unit 1212C, 1222C) configured to transmit the upper limit power acquired by the upper limit power acquisition unit to the power apparatus, or an upper limit power storage unit (the storage area) configured to store the upper limit power in a readable manner by the power apparatus.

According to (2), the upper limit notification unit notifies the power apparatus to which the power storage device is connected of the upper limit power, or the upper limit power storage unit stores the upper limit power in a readable manner, so that the power apparatus can acquire the upper limit power of the power storage device.

(3) The power storage device according to (1) or (2), in which the power storage device is provided to be electrically connectable to a power apparatus (the motor 3), and the power storage control unit further includes a required power acquisition unit (the required power acquisition unit 24) configured to acquire a required power correlated with a power requirement of the power apparatus to the power storage device.

According to (3), the power storage device can acquire the required power of the power apparatus to the power storage device.

(4) The power storage device according to (3), further including:

a power comparison unit (the power comparison unit 25) configured to compare the required power acquired by the required power acquisition unit with the upper limit power acquired by the upper limit power acquisition unit; and a power storage device protection unit (the power storage device protection unit 26) that protects the power storage unit from outputting a power exceeding the upper limit power and/or from inputting a power exceeding the upper limit power when the required power exceeds or is predicted to exceed the upper limit power.

According to (4), the power storage device can be avoided from being used in excess of the upper limit power by the power storage device protection unit.

(5) The power storage device according to (4), further including:

a switchgear (the bidirectional switch 1213, 1223) disposed on a power transmission path between the power storage unit and the power apparatus and being capable of blocking and connecting the power transmission path, in which the power storage device protection unit blocks the power transmission path by the switchgear when the required power exceeds or is predicted to exceed the upper limit power.

According to (5), the power transmission path is blocked by the switchgear, so that the power storage device can be avoided from being used in excess of the upper limit power.

(6) The power storage device according to any one of (3) to (5), further including:

a power comparison unit (the power comparison unit 25) configured to compare the required power acquired by the required power acquisition unit with the upper limit power acquired by the upper limit power acquisition unit; and a response unit (the response unit 27) that responds to the power apparatus to reduce the required power when the required power exceeds or is predicted to exceed the upper limit power.

According to (6), the power storage device can be avoided from being used in excess of the upper limit power by the response unit.

(7) The power storage device according to any one of (3) to (6), in which the required power acquisition unit is configured to acquire the required power based on an input by a user of the power apparatus.

According to (7), the required power acquisition unit can acquire the required power based on the input of the user of the power apparatus such as rotation of a throttle and depression of an accelerator.

(8) The power storage device according to any one of (1) to (7), in which the upper limit power acquisition unit is configured to acquire the upper limit power based on a predetermined upper limit power map including a relationship between the state of the power storage unit and the upper limit power.

According to (8), the upper limit power is acquired based on the upper limit power map, so that a load required for acquiring the upper limit power can be reduced.

(9) The power storage device according to (8), in which the state of the power storage unit includes a capacity state (the SOC) or a temperature state (the temperature).

According to (9), it is possible to appropriately acquire the upper limit power of the power storage device that changes according to the capacity state or the temperature state of the power storage unit.

(10) The power storage device according to any one of (1) to (9), further including:

a housing (the housing 40), in which the power storage unit and the power storage control unit are accommodated in the housing.

According to (10), the power storage unit and the power storage control unit can be integrally handled.

(11) A power storage device including:

a plurality of the power storage devices according to any one of (1) to (10), in which a representative control unit (the master BMU 1212), which is the power storage control unit of a representative power storage device (the master battery 121) that is any one of the plurality of power storage devices, includes an entire upper limit power acquisition unit (the upper limit power acquisition unit 23) configured to acquire an entire upper limit power that is an upper limit of a power output from all of the plurality of power storage devices or a power input to all of the plurality of power storage devices.

According to (11), the representative power storage device among the plurality of power storage devices holds the entire upper limit power, and thus even if the apparatus to which the power storage device is mounted is changed, a situation can be avoided in which the power storage device is used in excess of the entire upper limit power. Accordingly, the deterioration of the power storage device can be prevented, and the life of the power storage device can be extended.

(12) The power storage device according to (11), in which the entire upper limit power acquisition unit is configured to acquire the entire upper limit power based on a smallest upper limit power (Min ($PW_{lim1}$, $PW_{lim2}$, . . . , $PW_{limn}$)) of upper limit powers of the plurality of power storage devices, respectively.

According to (12), when the plurality of power storage devices are electrically connected to each other in series, the entire upper limit power is acquired based on the smallest upper limit power, so that the situation can be avoided in which the power storage device is used in excess of the entire upper limit power.

(13) The power storage device according to (12), in which when the plurality of power storage devices are electrically connected to each other in parallel, the entire upper limit power acquisition unit further acquires the entire upper limit power based on a largest current (Max ($|I_1|$, $|I_2|$, . . . , $|I_n|$) of output currents ($I_n$) or input currents of the plurality of power storage devices, respectively.

According to (13), when the plurality of power storage devices are electrically connected to each other in parallel, the entire upper limit power is acquired based on the smallest upper limit power of the upper limit powers of the plurality of power storage devices respectively and the largest current of the output currents or the input currents of the plurality of power storage devices respectively, so that the situation can be avoided in which the power storage device is used in excess of the entire upper limit power.

(14) The power storage device according to any one of (11) to (13), in which the plurality of power storage devices are provided to be electrically connectable to a power apparatus (the motor 3), the representative power storage device further includes a required power acquisition unit (the required power acquisition unit 24) configured to acquire a required power correlated with a power requirement of the power apparatus to the plurality of power storage devices, and the power storage device further includes an instruction unit (the power storage device protection unit 26) that instructs protection to a non-representative power storage device (the slave battery 122) that is the power storage device other than the representative power storage device among the plurality of power storage devices when the required power acquired by the required power acquisition unit exceeds or is predicted to exceed the entire upper limit power acquired by the entire upper limit power acquisition unit.

According to (14), the non-representative power storage device can be avoided from being used in excess of the upper limit power.

(15) The power storage device according to any one of (11) to (14), in which the representative control unit further includes an abnormality detection unit configured to detect an abnormality of a non-representative power storage device (the slave battery 122) that is the power storage device other than the representative power storage device among the plurality of power storage devices, and when the abnormality detection unit detects the abnormality of the non-representative power storage device, the entire upper limit power is acquired excluding the non-representative power storage device in which the abnormality is detected.

According to (15), the representative control unit acquires the entire upper limit power excluding the non-representative power storage device having the abnormality, so that the entire upper limit power can be appropriately acquired.

(16) The power storage device according to any one of (11) to (15), in which the representative power storage device further includes a self-abnormality detection unit configured to detect an abnormality of the representative power storage device, and when the self-abnormality detection unit detects the abnormality of the representative power storage device, the acquisition of the upper limit power by the entire upper limit power acquisition unit is continued when it is determined that a control of the representative control unit is continuable.

According to (16), even if the representative control unit is unable to perform power input/output, a function as the representative control unit is maintained, so that communication with the power apparatus can be smoothly performed.

(17) The power storage device according to any one of (11) to (16), in which a non-representative power storage device (the slave battery 122) that is the power storage device other than the representative power storage device among the plurality of power storage devices further includes a monitoring unit configured to monitor a state of the representative power storage device or receive that the representative power storage device is abnormal.

According to (17), the non-representative power storage device can understand the state of the representative power storage device.

(18) The power storage device according to (17), in which the non-representative power storage device includes a substitute entire upper limit power acquisition unit (the upper limit power acquisition unit 23) that acquires the entire upper limit power when the monitoring unit detects that the representative power storage device is abnormal or the entire upper limit power acquisition unit is not capable of acquiring the entire upper limit power.

According to (18), any one of the power storage devices that are the non-representative power storage devices exhibits a function as the substitute entire upper limit power acquisition unit, so that the power can be smoothly exchanged with the power apparatus even when the representative power storage device is abnormal or the like.

(19) The power storage device according to any one of (11) to (18), in which the plurality of power storage devices are provided to be electrically connectable to a power apparatus (the motor 3), and the plurality of power storage devices each further include a reception unit (the CAN-BUS transceiver 1215, 1225) configured to receive priority subordinate information capable of identifying a priority subordinate order (the order information) of the plurality of power storage devices transmitted by the power apparatus.

According to (19), the power storage devices can recognize the priority subordinate information.

(20) The power storage device according to (19), in which the plurality of power storage devices each further include a recognition unit (the communication control unit 1212C, 1222C) configured to recognize the representative power storage device based on the priority subordinate information received by the reception unit.

According to (20), any one of the plurality of power storage devices can function as the representative power storage device.

(21) The power storage device according to any one of (11) to (20), in which the plurality of power storage devices each further include a wireless communication unit capable of transmitting and receiving information to and from each other wirelessly.

According to (21), the information can be exchanged without depending on a communication path of the power apparatus, and the upper limit power can be acquired and managed accurately and stably.

(22) A vehicle (the vehicle 1) including:

a mounting unit (the battery mounting unit 15) to which the power storage device according to any one of (1) to (21) is mounted:

a power apparatus (the motor 3) electrically connected to the power storage device; and wheels (the wheel 2), in which the power apparatus is an electric motor (the motor 3) mechanically connected to the wheels.

According to (22), the user may replace the power storage device when a capacity of the power storage device is exhausted, and convenience of the vehicle is improved. The vehicle can recognize the upper limit power of the power storage device by receiving the upper limit power of the power storage device, and the life of the power storage device can be extended by using the power storage device with a power equal to or less than the upper limit power.

(23) A power storage device control method including:

a step of acquiring, by a computer of a power storage device provided to be electrically connectable to a power apparatus and including a power storage unit, based on a state of the power storage unit, an upper limit power that is an upper limit of a power output from the power storage unit or a power input to the power storage unit.

According to (23), the power storage device acquires the upper limit power, so that even if the apparatus to which the power storage device is mounted is changed, the situation can be avoided in which the power storage device is used in excess of the upper limit power. Accordingly, the life of the power storage device can be extended, and types of apparatuses to which the power storage device is equipped increase.

(24) A program, in which the program is configured to cause a computer of a power storage device provided to be electrically connectable to a power apparatus and including a power storage unit to execute a step of acquiring, based on a state of the power storage unit, an upper limit power that is an upper limit of a power output from the power storage unit or a power input to the power storage unit.

According to (24), the power storage device acquires the upper limit power, so that even if the apparatus to which the power storage device is mounted is changed, the situation can be avoided in which the power storage device is used in excess of the upper limit power. Accordingly, the life of the power storage device can be extended, and the types of apparatuses to which the power storage device is equipped increase.

REFERENCE SIGNS LIST

- 1: vehicle
- 2: wheel
- 3: motor (power apparatus)
- 4: power storage device
- 15: battery mounting unit (mounting unit)
- 23: upper limit power acquisition unit (upper limit power acquisition unit, entire upper limit power acquisition unit, substitute entire upper limit power acquisition unit)
- 24: required power acquisition unit
- 25: power comparison unit
- 26: power storage device protection unit (power storage device protection unit, instruction unit)
- 27: response unit
- 121: battery, master battery (power storage device, representative power storage device)
- 122: slave battery (non-representative power storage device)
- 1211, 1221: power storage unit
- 1212: BMU, master BMU (power storage control unit, representative control unit)
- 1212C, 1222C: communication control unit (recognition unit)
- 1213, 1223: bidirectional switch (switchgear)
- 1215, 1225: CAN-BUS transceiver (reception unit)
- 1212: BMU, master BMU (power storage control unit, representative control unit)

The invention claimed is:

1. A power storage device comprising:

a battery including a plurality of cells;

a connector configured to be connected to a communication line provided in a power apparatus; and a power storage control unit configured to control the battery, wherein the power storage control unit includes an upper limit power acquisition unit configured to acquire, based on a state of the battery, an upper limit power value that indicates an upper limit of a power output from the battery or a power input to the battery, wherein the power storage device is attachable to and detachable from the power apparatus to be electrically connectable to the power apparatus, wherein the power storage device further comprises an upper limit notification unit configured to transmit the upper limit power value acquired by the upper limit power acquisition unit to the power apparatus, and wherein the power storage control unit and the upper limit notification unit are each implemented via at least one processor.

2. The power storage device according to claim 1, wherein:

the power storage control unit further includes a required power acquisition unit configured to acquire a required power correlated with a power requirement of the power apparatus to the power storage device, and wherein the required power acquisition unit is implemented via at least one processor.

3. The power storage device according to claim 2, further comprising:

a power comparison unit configured to compare the required power acquired by the required power acquisition unit with the upper limit power value acquired by the upper limit power acquisition unit; and a power storage device protection unit that protects the battery from outputting a power exceeding the upper limit power value or from inputting a power exceeding the upper limit power value when the required power exceeds or is predicted to exceed the upper limit power value, wherein the power comparison unit and the power storage device protection unit are each implemented via at least one processor.

4. The power storage device according to claim 3, further comprising:

a switchgear disposed on a power transmission path between the battery and the power apparatus and being capable of blocking and connecting the power transmission path, wherein the power storage device protection unit blocks the power transmission path by the switchgear when the required power exceeds or is predicted to exceed the upper limit power value.

5. The power storage device according to claim 2, further comprising:

a power comparison unit configured to compare the required power acquired by the required power acquisition unit with the upper limit power value acquired by the upper limit power acquisition unit; and a response unit that responds to the power apparatus to reduce the required power when the required power exceeds or is predicted to exceed the upper limit power value, wherein the power comparison unit and the response unit are each implemented via at least one processor.

6. The power storage device according to claim 2, wherein the required power acquisition unit is configured to acquire the required power based on a signal generated by an operation input unit that detects a user operation.

7. The power storage device according to claim 1, wherein the upper limit power acquisition unit is configured to acquire the upper limit power value based on a predetermined upper limit power map including a relationship between the state of the battery and the upper limit power value.

8. The power storage device according to claim 7, wherein the state of the battery includes a capacity state or a temperature state.

9. The power storage device according to claim 1, further comprising:

a housing, wherein the battery and the power storage control unit are accommodated in the housing.

10. A power storage device comprising:

a plurality of the power storage devices according to claim 1, wherein a representative control unit, which is the power storage control unit of a representative power storage device that is any one of the plurality of power storage devices, includes an entire upper limit power acquisition unit configured to acquire an entire upper limit power that is an upper limit of a power output from all of the plurality of power storage devices or a power input to all of the plurality of power storage devices.

11. The power storage device according to claim 10, wherein the entire upper limit power acquisition unit is configured to acquire the entire upper limit power based on a smallest upper limit power of upper limit powers of the plurality of power storage devices, respectively.

12. The power storage device according to claim 11, wherein when the plurality of power storage devices are electrically connected to each other in parallel, the entire upper limit power acquisition unit further acquires the entire upper limit power based on a largest current of output currents or input currents of the plurality of power storage devices, respectively.

13. The power storage device according to claim 10, wherein:

the plurality of power storage devices are provided to be electrically connectable to a power apparatus;

the representative power storage device further includes a required power acquisition unit configured to acquire a required power correlated with a power requirement of the power apparatus to the plurality of power storage devices; and the power storage device further comprises an instruction unit that instructs protection to a non-representative power storage device that is the power storage device other than the representative power storage device among the plurality of power storage devices when the required power acquired by the required power acquisition unit exceeds or is predicted to exceed the entire upper limit power acquired by the entire upper limit power acquisition unit.

14. The power storage device according to claim 10, wherein:

the representative control unit further includes an abnormality detection unit configured to detect an abnormality of a non-representative power storage device that is the power storage device other than the representative power storage device among the plurality of power storage devices; and when the abnormality detection unit detects the abnormality of the non-representative power storage device, the entire upper limit power is acquired excluding the non-representative power storage device in which the abnormality is detected.

15. The power storage device according to claim 10, wherein:

the representative power storage device further includes a self-abnormality detection unit configured to detect an abnormality of the representative power storage device; and when the self-abnormality detection unit detects the abnormality of the representative power storage device, the acquisition of the upper limit power by the entire upper limit power acquisition unit is continued when it is determined that a control of the representative control unit is continuable.

16. The power storage device according to claim 10, wherein a non-representative power storage device that is the power storage device other than the representative power storage device among the plurality of power storage devices further includes a monitoring unit configured to monitor a state of the representative power storage device or receive that the representative power storage device is abnormal.

17. The power storage device according to claim 16, wherein the non-representative power storage device includes a substitute entire upper limit power acquisition unit that acquires the entire upper limit power when the monitoring unit detects that the representative power storage device is abnormal or the entire upper limit power acquisition unit is not capable of acquiring the entire upper limit power.

18. The power storage device according to claim 10, wherein:

the plurality of power storage devices are provided to be electrically connectable to a power apparatus; and the plurality of power storage devices each further include a reception unit configured to receive priority subordinate information capable of identifying a priority subordinate order of the plurality of power storage devices transmitted by the power apparatus.

19. The power storage device according to claim 18, wherein the plurality of power storage devices each further include a recognition unit configured to recognize the representative power storage device based on the priority subordinate information received by the reception unit.

20. The power storage device according to claim 10, wherein the plurality of power storage devices each further include a wireless communication unit capable of transmitting and receiving information to and from each other wirelessly.

21. A vehicle comprising:

a mounting unit to which the power storage device according to claim 1 is mounted;

a power apparatus electrically connected to the power storage device; and wheels, wherein the power apparatus is an electric motor mechanically connected to the wheels.

22. The power storage device according to claim 1, further comprising:

a housing, wherein the connector is accommodated in the housing.

23. The power storage device according to claim 22, wherein the upper limit value is transmitted to an outside of the housing.

24. The power storage device according to claim 22, wherein the power storage control unit and the upper limit notification unit are accommodated in the housing.

25. The power storage device according to claim 2, wherein the required power acquisition unit acquires the required power via a communication line from the power apparatus.

* * * * *